United States Patent [19]
Hirata et al.

[11] Patent Number: 5,966,222
[45] Date of Patent: Oct. 12, 1999

[54] IMAGE FORMING APPARATUS HAVING A SATURATION CORRECTION UNIT

[75] Inventors: Katsuyuki Hirata, Toyokawa; Yoshinobu Hada, Aichi-ken; Kentaro Katori; Yukihiko Okuno, both of Toyokawa; Masahiro Kouzaki, Gamagori, all of Japan

[73] Assignee: Minolta Co., Ltd., Osaka, Japan

[21] Appl. No.: 08/822,354

[22] Filed: Mar. 20, 1997

[30] Foreign Application Priority Data

Mar. 22, 1996  [JP]  Japan ..................................... 8-066647

[51] Int. Cl.⁶ ..................................................... H04N 1/46
[52] U.S. Cl. ........................... 358/520; 358/530; 358/518; 382/162; 382/167
[58] Field of Search ..................................... 358/296, 401, 358/501, 448, 518, 520, 530; 382/162, 167

[56] References Cited

U.S. PATENT DOCUMENTS

| | | | |
|---|---|---|---|
| 5,204,948 | 4/1993 | Kato | 395/162 |
| 5,345,320 | 9/1994 | Hirota | 358/518 |
| 5,371,609 | 12/1994 | Suzuki et al. | 358/448 |
| 5,398,124 | 3/1995 | Hirota | 358/530 |
| 5,563,726 | 10/1996 | Suzuki et al. | 358/539 |

FOREIGN PATENT DOCUMENTS

| | | | |
|---|---|---|---|
| 5-181964 | 7/1993 | Japan | H04N 1/40 |
| 7-307861 | 11/1995 | Japan | H04N 1/40 |

*Primary Examiner*—Jerome Grant, II
*Attorney, Agent, or Firm*—Sidley & Austin

[57] ABSTRACT

The individual pattern of each color of the standard pattern is printed on a copy being made, and when the copy is read by a scanner, the image data of the standard pattern are converted into color region signals in a uniform color space by an HVC converter and a C·H operation unit. In the case where the saturation of the image data has become lower than the standard saturation of the color region, saturation corrective coefficients are determined by a saturation corrective coefficient calculation unit. After the saturation coefficients have been determined for each color of the standard pattern, the image data of the original are read out, and the saturation corrective coefficients for the color region of the image data are used for saturation correction by a saturation correction processing unit. The image data which have been subjected to the saturation correction are reversely converted into the image data of each color by a reverse HVC converter. According to the reversely converted image data, an image is formed on a copying paper.

8 Claims, 20 Drawing Sheets

FIG. 4A
FIG. 4B
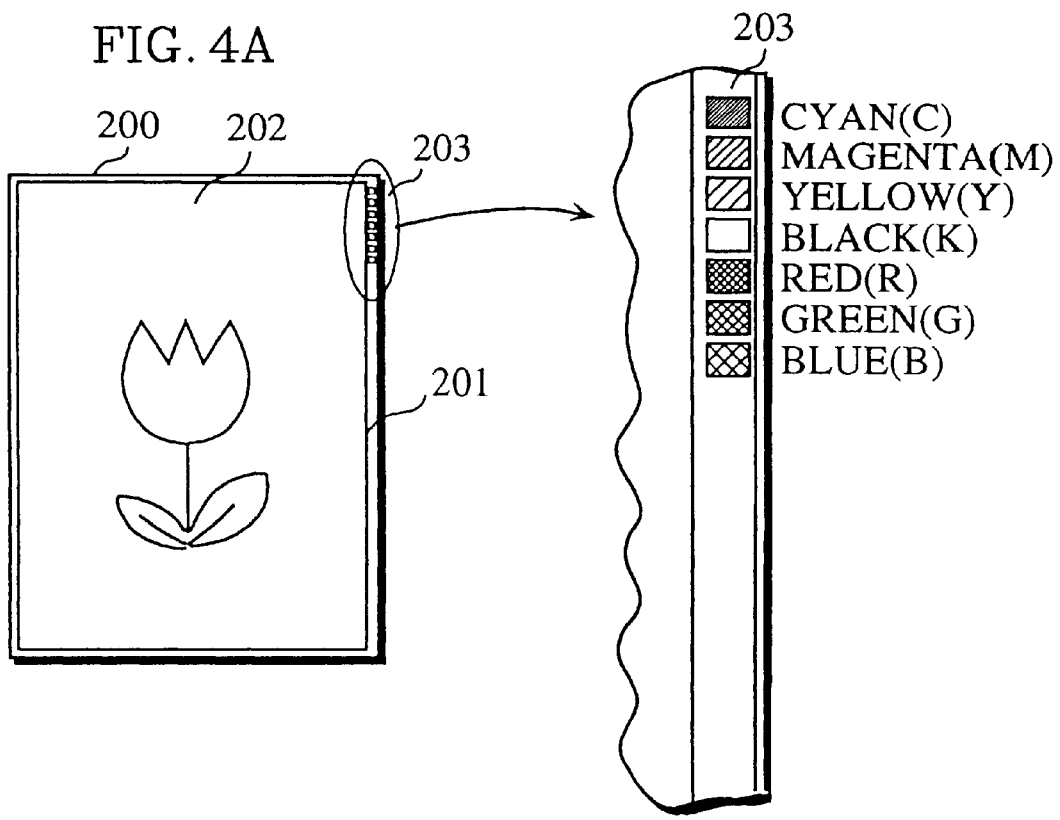
FIG. 5
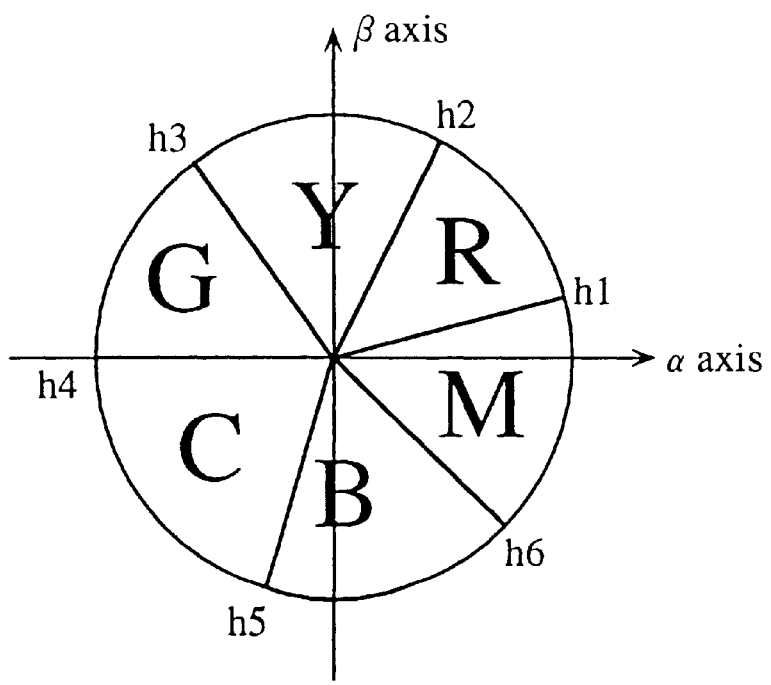

| COLOR REGION | DISCRIMINATION CONDITION |
| --- | --- |
| | HUE |
| R | h1~h2 |
| Y | h2~h3 |
| G | h3~h4 |
| C | h4~h5 |
| B | h5~h6 |
| M | h6~2π, 0~h1 |

| COLOR REPRODUCTION REGION | A | B | C | D |
|---|---|---|---|---|
| UCR/BP LEVEL | STANDARD | +1 | +2 | +3 |
| UCR/BP CORRECTIVE COEFFICIENT | $t_0$ $u_0$ $p_0$ $q_0$ | $t_1$ $u_1$ $p_1$ $q_1$ | $t_2$ $u_2$ $p_2$ $q_2$ | $t_3$ $u_3$ $p_3$ $q_3$ |
| DENSITY CORRECTIVE COEFFICIENT | $k_0$ | $k_1$ | $k_2$ | $k_3$ |

Tb2

IMAGE FORMING APPARATUS HAVING A SATURATION CORRECTION UNIT

BACKGROUND OF THE INVENTION (1) Field of the Invention

The present invention relates to an image forming apparatus, such as a digital color copying machine and a color facsimile machine, which reproduces a full-color image according to image data obtained by performing color-separation on an original image.

(2) Related Art

In an image forming apparatus, such as a digital color copying machine, digital image data of red (R), green (G), and blue (B) obtained by performing color separation on an original are converted into density data of cyan (C), magenta (M), yellow (Y), and black (K) used for color reproduction by an image signal processing unit, and a printing unit forms a reproduction image by transferring the toner of each color onto a copying paper according to the values of the density data.

In such image forming apparatus, the image signal processing unit performs correction on the image data to avoid image defects caused by low scanning accuracy, poor color reproducibility, and other factors. After this correction, the printing unit forms a reproduction image.

In a full-color reproduction image, degradation in saturation is likely to catch the user's attention. When saturation degradation in the reproduction image is anticipated due to the granular characteristics of the toners, saturation correction needs to be performed on the image data by the image processing unit. In a conventional digital color copying machine, saturation correction is performed in accordance with the same saturation corrective condition regardless of the type of the original image.

In the case where the saturation corrective condition is determined invariably as above, however, when copying the reproduced image as an original, there are problems that a decrease in saturation is noticeable, and that the image defects get worse as the generation of a copy becomes newer.

Compared with a silver print, the input and output resolution of a conventional digital color copying machine is limited. The reproducible ranges of color and density are narrow, and the diameter of a toner particle in the printing unit is large. When inspected closely, the reproduction dots of the toner particles have different shapes, which results in uneven density and minute noise in the reproduction image. So, it is imperative that the reproduction image (hereinafter referred to as "hard copy") show a deterioration in saturation. When copying such hard copy as an original (a copy made from a hard copy is called a "generation copy" in the sense that a newer copy is made one generation after another), the density unevenness, the minute noise, and the impurity are increased even more, which causes a further decrease in saturation.

Taking the above problems into consideration, when making a generation copy, it is necessary to set a variety of saturation corrective conditions which can compensate for the image deterioration of the hard copy.

SUMMARY OF THE INVENTION

The present invention is aimed at providing an image forming apparatus which performs suitable saturation correction on a particular original such as a hard copy and forms a color image with excellent reproducibility.

To achieve the above object, the image forming apparatus of the present invention comprises: an input unit for receiving image data of each color obtained by reading an original; an original type discriminator for determining whether the original is of a particular type or not; a condition deciding unit for determining saturation corrective conditions for the image data according to the discrimination result; a saturation correction unit for performing saturation correction on the image data according to the determined saturation corrective conditions; and an image forming unit for forming an image according to the corrected image data.

In the case where the original has been judged to be a particular type by the original discriminator, the saturation corrective conditions are determined accordingly to perform suitable saturation correction. So, even if the particular original has been made by copying, the saturation correction can be performed to compensate any saturation decrease. Thus, a reproduction image with excellent reproducibility can be achieved.

The above object can also be achieved by a copying method which comprises the steps of; (1) reading an original image and generating the image data of each color; (2) incorporating the printing data of a standard pattern into the image data generated in step (1), and forming an image in accordance with the incorporated image data; (3) reading the image formed in step (2) as an original, and generating the image data of each color; (4) determining saturation corrective conditions in accordance with the image data of the standard pattern detected in the original image data read in step (3); (5) performing saturation correction on the original image data in accordance with the saturation corrective conditions determined in step (4); and forming an image in accordance with the image data which have been subjected to saturation correction in step (5).

In the present invention, when reproducing an initial image, the standard pattern is formed together with the original image. In the case where the reproduction image is copied, the saturation corrective conditions are determined in accordance with the image data obtained by reading the standard pattern. Thus, saturation correction can be conducted with desirable results.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 4 shows an example standard pattern printed on a copying paper by the digital color copying machine of the present invention.

FIG. 5 shows the color regions on the $\alpha\beta$ plane in the HVC color space to which the colors used in the standard pattern belong.

DESCRIPTION OF THE PREFERRED EMBODIMENTS

The following is an explanation of the embodiments of the image forming apparatus of the present invention applied to a digital color copying machine.

Figure 1:
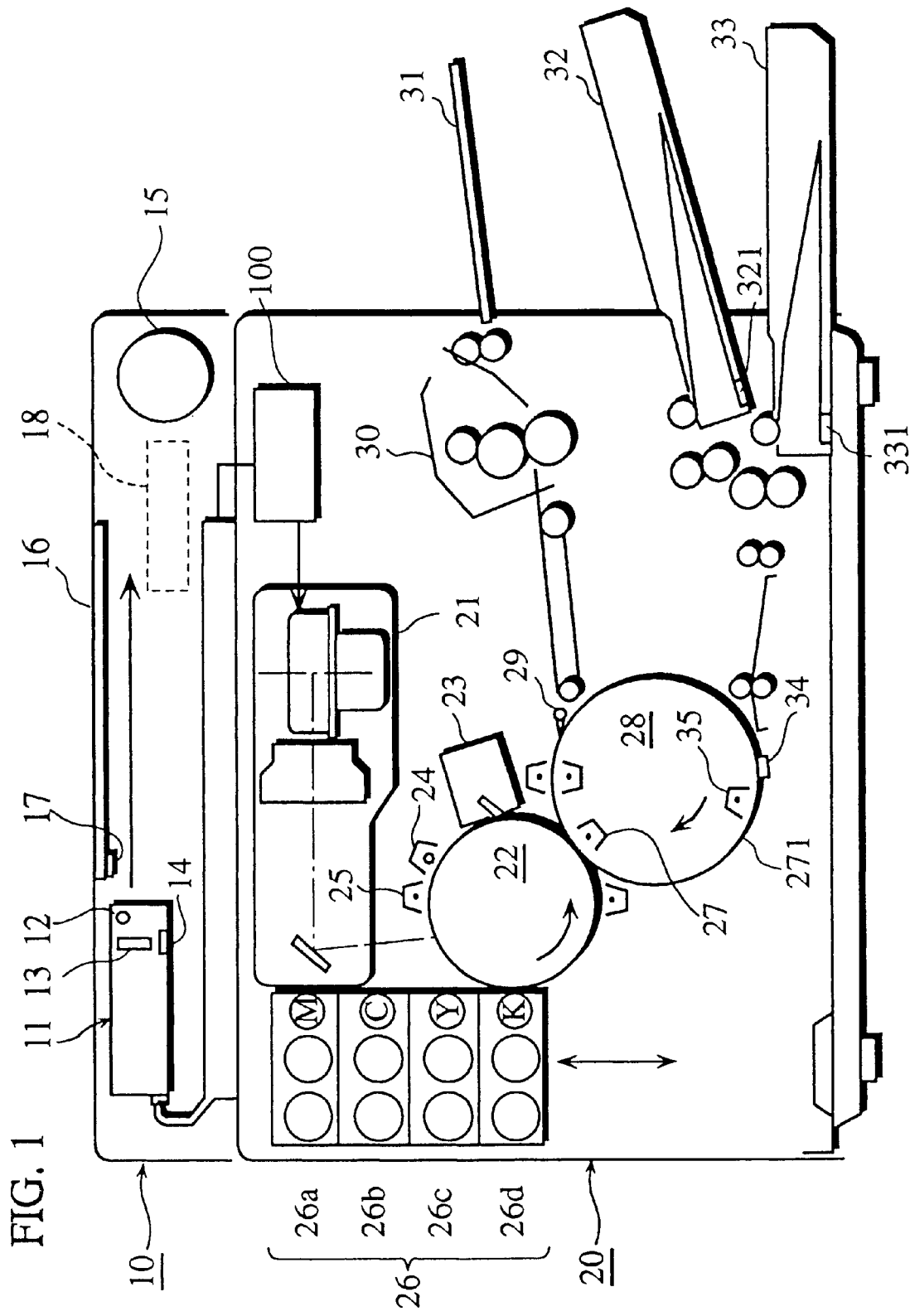
FIG. 1 shows the overall structure of a digital color copying machine in a first embodiment of the present invention.

(1) First Embodiment (1-1) Overall Structure of the Digital Color Copying Machine FIG. 1 shows the overall structure of the digital color copying machine in the first embodiment of the present invention.

This digital color copying machine mainly comprises an image reading unit 10 for reading an original image and a printing unit 20 for reproducing the image read by the image reading unit 10.

A scanner 11 in the image reading unit 10 includes an exposure lamp 12 for irradiating an original, a rod lens array 13 for gathering reflection light from the original, and a contact-type CCD color image sensor 14 (hereinafter referred to simply as a CCD sensor 14) for transforming the gathered light into electric signals. When reading an original, the scanner 11 is driven by a motor 15 and moves in the direction of the arrow (sub-scanning direction) to scan the original placed on a transparent platen 16. The CCD sensor 14 is provided with filter (not shown) corresponding to red (R), green (G), and blue (B).

The image data of red (R), green (G), and blue (B) are subjected to correction in an image signal processing unit 120 in a control unit (shown in FIG. 2), and then converted into gradation data of the reproduction colors of cyan (C), magenta (M), yellow (Y), and black (K). Hereinafter, red, green, and blue will be referred to simply as "R, G, and B" or "r, g, and b", and cyan, magenta, yellow, and black will be referred to simply as "C, M, Y, and K", respectively.

These gradation data of the reproduction colors are outputted to a printer control unit 130 (shown in FIG. 2) in the printer control unit 100, where they are subjected to gamma correction or dither processing depending on the gradient characteristics, and converted into driving signals of a laser diode. For each reproduction color, the laser diode in the printer head unit 21 exposes the surface of a photosensitive drum 22.

Prior to the irradiation, the remaining toners on the surface of the photosensitive drum 22 have been removed by a cleaner 23, and the photosensitive drum 22 has been irradiated by an eraser lamp 24 and charged uniformly by a sensitizing charger 25. When the exposure is performed on the photosensitive drum 22 in the uniformly charged state, an electrostatic latent image is formed on the surface of it.

A toner developing unit 26 provided with toner developers 26a–26d corresponding to C, M, Y, and K is moved up and down by an elevating unit (not shown) in synchronization with the rotation of the photosensitive drum 22. One of the toner developers 26a–26d corresponding to the color of the formed electrostatic latent image is selected to develop the electrostatic latent image on the surface of the photosensitive drum 22.

Meanwhile, a transfer drum 28 is supplied with copying papers (not shown) of a preferred size by selecting one of paper cassettes 32 and 33 by the printer control unit 130. The paper cassette selection is performed in accordance with detection signals from paper size detection sensors 321 and 331 disposed on the paper cassettes 32 and 33. The paper size detection sensors 321 and 331 are formed by photoelectric sensors or the like. The front edge of a copying paper is then held by a chucking mechanism 34 disposed on the transfer drum 28, and electrostatically pulled by a suction charger 35 so that the copying paper does not slip on the transfer drum 28. The image developed on the photosensitive drum 22 is then transferred onto the copying paper on the transfer drum 28 by a transfer charger 27.

The above printing process is repeated for all the colors of C, M, Y, and K, and when the printing of all the colors has been finished, a separation claw 29 is activated to separate the copying paper from the surface of the transfer drum 28.

Since the toner image transferred onto the copying paper can be easily removed, the toners are fixed to the surface of the copying paper by heating and pressing with a fixing unit 30. The copying paper with the fixed toner image is then discharged onto a paper tray 31.

An operation panel 18 is disposed on the front side of the image reading unit 10 so that is it easy for users to operate. The operation panel 18 comprises a 10-keypad for inputting the number of copies to be made and a start key for starting the operation.

Figure 2:
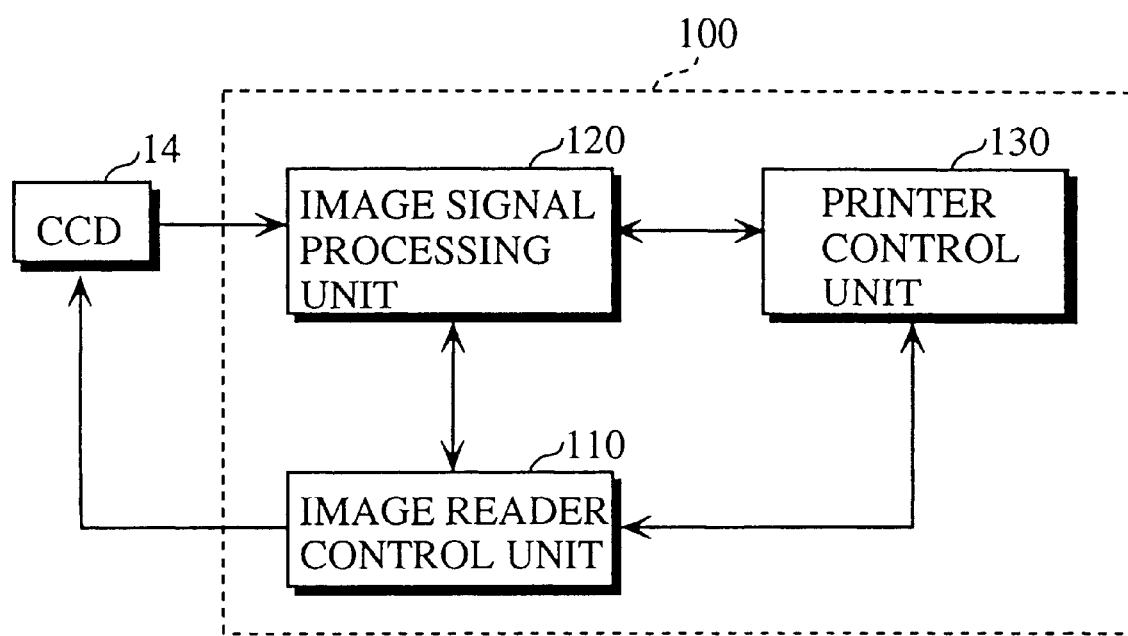
FIG. 2 is a block diagram of a control unit in the digital color copying machine of the present invention.

The following explanation is for the structure of the control unit 100 of the digital color copying machine, with reference to the block diagram of FIG. 2.

The control unit 100 consists of an image reader control unit 110, an image signal processing unit 120, and a printer control unit 130.

The image reader control unit 110 controls the operations of the image reading unit 10 when reading an original. The operations of the image reading unit 10 include switching on and off the CCD sensor 14 and the exposure lamp 12, and scanning the original with the scanner 11 driven by the motor 15.

The image signal processing unit 120 processes the image data of R, G, and B sent from the CCD sensor 14 in the scanner 11, and transforms the image data into the image data of the reproduction colors of C, M, Y, and K to achieve the optimum reproduction images.

The printer control unit 130 controls the operation of each part of the printer unit 20. It performs gamma correction on the image data outputted from the image signal processing unit 120, controls the output of the printer head unit 21 by performing dither processing when a multi-valued dither method is used as a gradation expressing technique, and also controls the synchronization of the following actions: the paper supply from the paper cassette 32 or 33; the rotation of the photosensitive drum 22 and the transfer drum 28; the vertical movement of the toner developing unit 26; and the charge supply for each charger.

In response to the instructions from the printer control unit 130, the printer unit 20 performs printing of a standard pattern which is set as the standard for region discrimination and saturation correction on a predetermined place of a copying paper. An explanation of this procedure can be found later in the specification.

(1-2) Structure of the image signal processing unit

The following is an explanation of the structure of the image signal processing unit 120.

Figure 3:
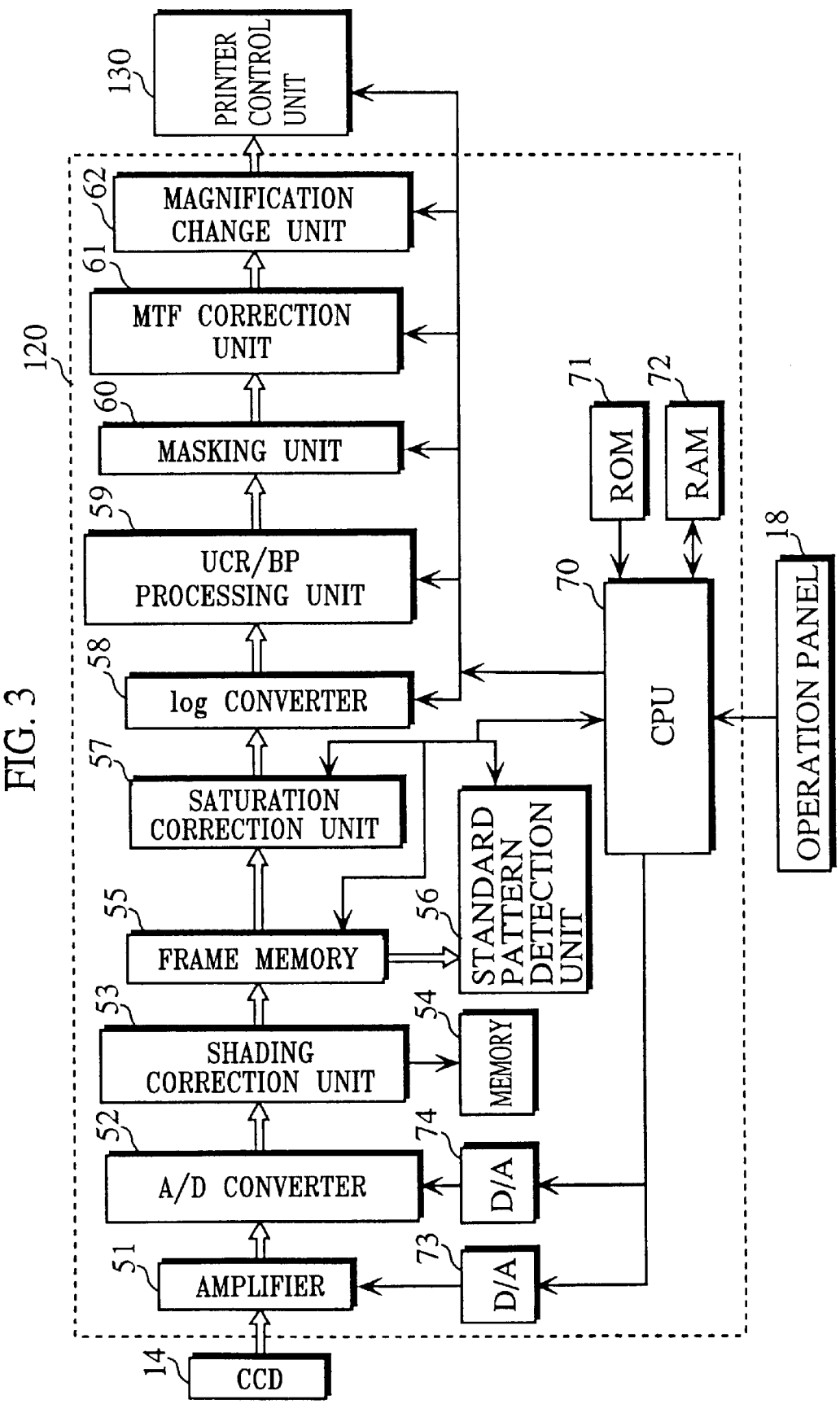
FIG. 3 is a block diagram of a image signal processing unit of FIG. 2 in the control unit.

FIG. 3 is a block diagram of the image signal processing unit 120. In this figure, the outline arrows indicate the flow of image data, and the solid line arrows indicate the flow of control signals.

The image signals photoelectrically converted by the CCD sensor 14 in the scanner 11 are amplified by an amplifier 51, and converted into multi-valued digital image data of R, G, and B by an A/D converter 52. The amplifying ratio and the reference voltage of the A/D converter 52 are controlled by a CPU 70 through D/A converters 73 and 74.

The digitized image data are subjected to shading correction by a shading correction unit 53.

This shading correction is aimed at correcting uneven exposure by the exposure lamp 12 and irregular sensitivity of the CCD sensor 14. A white standard plate 17 (shown in FIG. 1) disposed at an edge portion of the platen 16 is pre-scanned to obtain the image data of the standard white. Here, a multiplication ratio for each pixel of the white image is determined and stored in the internal memory of the shading correction unit 53. When reading an original, corrections are performed by multiplying each pixel data by the multiplication ratio stored in the internal memory.

The image data of R, G, and B which have been subjected to shading correction are temporarily written in a frame memory 55.

When the original read by the CCD sensor 14 is a hard copy of the copying machine, the standard pattern for saturation correction is printed by the printing unit 20, unless the pattern printing is prohibited by the user through the operation panel 18.

FIG. 4 is an example standard pattern. Within the image printing area 201 of a copying paper 200, an original image 202 is printed, and in the right side margin, a standard pattern 203 is printed in addition to the original image. This standard pattern is formed by a set of small squares painted in C, M, Y, K, R, G, and B, which are aligned longitudinally (hereinafter, each color square will be referred to as individual color pattern).

The printing data for printing the standard pattern 203 is stored in a ROM 71 (shown in FIG. 3) in advance. Unless the user sends an instruction to prohibit the pattern printing, the printer control unit 130 reads the printing data through the CPU 70 when initial copying is performed. The printing unit 20 prints the standard pattern in addition to the original image, according to the printing data for the standard pattern 203.

Except for "K", the other six colors contained in the standard pattern correspond to the six color regions on a color plane ($\alpha\beta$ plane) in an HVC color space. When generation copying is performed, the color regions of the image data are discriminated in accordance with the six color regions. (In the embodiments, "color regions" refer to the color regions consisting of C, M, Y, R, G, and B. In the drawings, h1–h6 indicate the hue on the boundary of color regions.)

The standard pattern for "K" is used as the standard for determining the below-mentioned transformation formula (Equation (1)) to project the image data of R, G, and B in the HVC color space.

Upon pre-scanning, the standard pattern 203 is subjected to color separation as well as the image 202 within the image printing area 201, and the image data of each color is written in the frame memory 55. A standard pattern detection unit 56 retrieves the image data written in the frame memory 55, and informs the CPU 70 that the image data of the standard pattern is to be detected and where it is stored in the frame memory. Here, only one of the image data of R, G, and B is detected.

By doing so, the original is judged to be a hard copy, and the CPU 70 enters the generation mode to instruct a saturation correction unit 57 to perform predetermined saturation correction by comparing the read image data of the standard pattern 203 with the printing data of the standard pattern set in the ROM 71 in advance. The structure of the saturation correction unit 57 is described in the next section.

At this stage, the image data which has been subjected to saturation correction by the saturation correction unit 57 is still the reflectance data of the original image, and therefore converted into the density data of the actual image by a log converter 58.

The photoelectric conversion characteristics of the output data from the CCD sensor 14 are proportional to the incident strength (the reflection ratio of the original). The reflection ratio of the original, however, is not proportional to the density of the original, and the relationship between them can be represented by a predetermined logarithmic curve. The reflectance data from the CCD sensor 14 is subjected to log conversion by the log converter 58 and converted into density data proportional to the original density.

The density data thus obtained is sent to a UCR/BP processing unit 59. To improve the black reproducibility, black paint (BP) is performed by using the predetermined ratio of the common portion of the three primary color density data as the black density. Also, undercolor removal (UCR) is performed by subtracting the black density from the three-color density data.

This black color generation is necessary, because pure black is hard to reproduce by the overlapping of C, M, and Y toners, due to the adverse influence of the spectral characteristics of each toner. From this point of view, the black density is predetermined from the density data of each primary color, and pure black is reproduced using the toner of K in accordance with the black density value.

The image data which have been subjected to UCR and BP are sent to a masking unit 60, where they are subjected to linear correction to enhance the color reproducibility, and converted into density data of C, M, and Y.

The density data of C, M, and Y is then subjected to smoothing by an MTF (modulation transfer function) correction unit 61 using two-dimensional spatial filter. The smoothing reduces image noise by performing a moving average with weighted addition on the image data of the periphery pixel of the central pixel to obtain a smoother reproduction image.

The image data which has been subjected to MTF correction is then sent to a magnification change unit 62, where the magnification is changed to a value predetermined by the user with the operation panel 18. The image data is outputted to the printer control unit 130, and finally reproduced onto a copying paper by the printing unit 20.

(1-3) Structure and Operations of the Saturation Correction Unit

Figure 6:
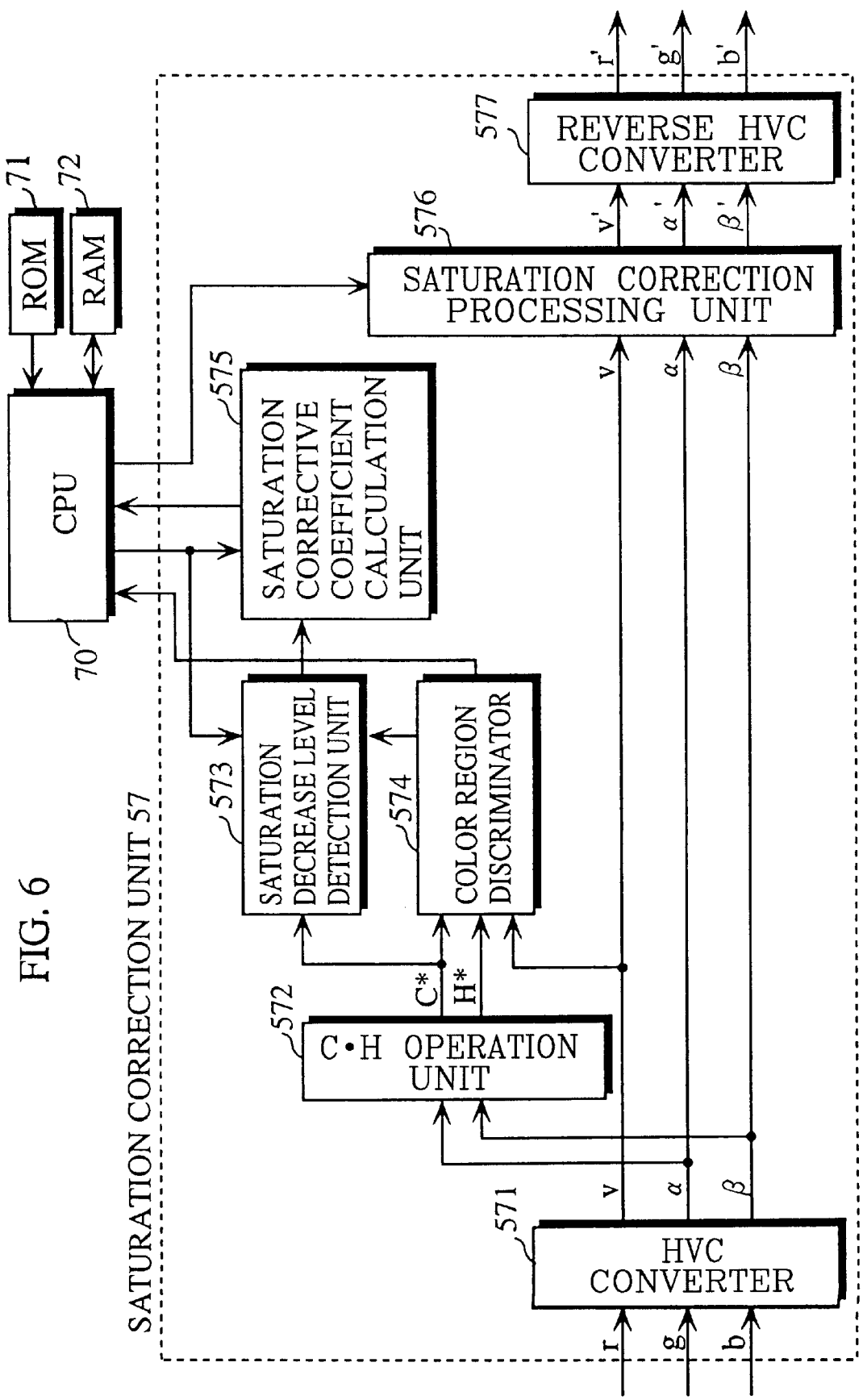
FIG. 6 is a block diagram of a saturation correction unit in the image signal processing unit.

The following is an explanation of the saturation correction unit 57 in the image signal processing unit 120, with reference to the block diagram of FIG. 6.

In this figure, the flow of the image data is indicated by solid line arrows for each color or each color region signal to fully describe the process of the image data transformation.

As described above, the standard pattern detection unit 56 detects the standard pattern 203 from the image data written in the frame memory 55, and informs the CPU 70 of the storage position of the standard pattern 203 in the frame memory. The CPU 70 instructs the saturation correction unit 57 to read the standard pattern 203 and compare the image data with the printing data of the standard pattern set in the ROM 71 beforehand.

Upon receipt of the instruction, the saturation correction unit 57 selects the image data of r, g, and b of only one pixel from the individual color patterns of the standard pattern 203. The selected image data is converted into color region signals v, $\alpha$, and $\beta$ in the HVC color region by an HVC converter 571.

The relationship between the image data of r, g, and b, and the color region signals v, $\alpha$, and $\beta$ can be represented by the following Equation (1). The HVC converter 571 converts the image data of r, g, and b of the standard pattern into the color region signals v, $\alpha$, and $\beta$, using this transformation formula.

$$\begin{pmatrix} \alpha \\ \beta \\ v \end{pmatrix} = \begin{pmatrix} a_{11} & a_{12} & a_{13} \\ a_{21} & a_{22} & a_{23} \\ a_{31} & a_{32} & a_{33} \end{pmatrix} \times \begin{pmatrix} r \\ g \\ b \end{pmatrix} \quad (1)$$

Figures 7, 8:
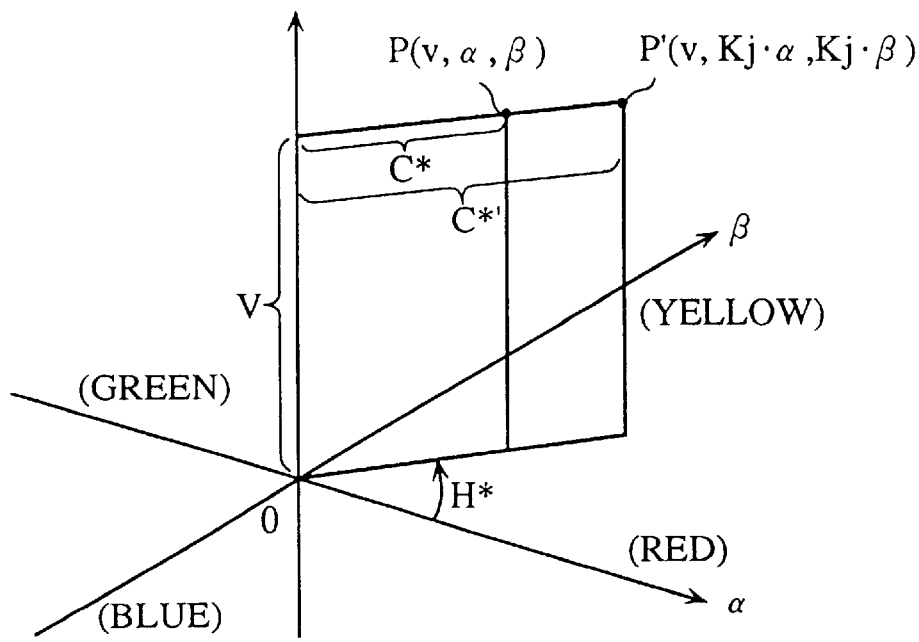
FIG. 7 shows how the saturation is corrected in the coordinate system in the HVC color space.
FIG. 8 shows a table for discriminating the color regions set in the color region discriminator in the saturation correction unit of FIG. 6.

FIG. 7 shows a three-dimensional coordinate system in the HVC color space. The ordinate axis indicates lightness (V), and the other two transverse axes indicate color tone. An axis a represents the degree of red in the positive direction and the degree of green in the negative direction. An axis $\beta$ represents the degree of yellow in the positive direction and the degree of blue in the negative direction.

Since the colors on the ordinate axis are achromatic colors, the elements a11–a33 in the transformation formula of Equation (1) are determined according to the image data values obtained by reading the pattern of K from the standard pattern 203.

In such color space, the lightness (V) at point P in the color space is equal to v outputted from the HVC converter 571, and saturation (C*) and hue (H*) can be determined by the following Equations (2) and (3).

$$C^* = (\alpha^2 + \beta^2)^{1/2} \quad (2)$$

$$H^* = \tan^{-1}(\beta/\alpha) \quad (3)$$

A C·H operation unit 572 determines saturation (C*) and hue (H*) using Equations (2) and (3).

A color region discriminator 574 determines to which color region each image data belongs, in accordance with the value of the hue (H*). The color region discriminator 574 is provided with a table Tb1 for color region discrimination corresponding to the color regions of the standard pattern 203 as shown in FIG. 8.

In the column of hue in the table Tb1, hn (n=1 to 6) indicates the hue on the boundary between two color regions shown in FIG. 5. If the column of hue shows "h1–h2", for instance, the hue is in the range of h1 to h2.

When the value of H* of the image data has been inputted, the color region discriminator 574 determines to which color region each image data belongs, in accordance with the table Tb1 and sends the determined results to the CPU 70 as color region information.

In the ROM 71, a standard saturation Crj (j=C, M, Y, R, G, and B; hereinafter, "j" indicates the same) is stored for each color region of the standard pattern. The CPU 70 reads the standard saturation Crj of the suitable color region from the ROM 71 according to the color region information sent from the color region discriminator 574, and the standard saturation Crj is sent to a saturation decrease level detection unit 573.

The saturation decreasing level detection unit 573 compares the standard saturation Crj with the saturation Cj obtained by reading the standard pattern. When the saturation Cj is lower than the standard saturation Crj (Cj<Crj), a saturation decrease signal is sent to the CPU 70, which decides that a change of saturation correction conditions is necessary, and instructs a saturation correction coefficient calculating unit 575 to determine a saturation correction coefficient Kj.

Since Crj can be generally equal to Kj·Cj, the saturation correction coefficient calculating unit 575 determines the saturation correction coefficient Kj from Crj/Cj, and the determined value is stored in a RAM 72 by the CPU 70.

On the other hand, in the ROM 71, a standard saturation correction coefficient Ksj is stored in advance. When no saturation decrease has been detected by the saturation decrease level detection unit 573, Ksj is set as Kj, and stored in the RAM 72.

The saturation correction is performed by setting the standard correction coefficient Ksj even when there is no saturation decrease detected, because the saturation needs to be increased in case the saturation decreases due to the toner characteristics in the printer unit. No saturation correction using the standard correction coefficient is necessary, if the reproducibility of the printing unit is almost ideal and there is little decrease in the saturation.

The saturation correction coefficient Kj is determined for each color region of the standard pattern, and stored in the RAM 72.

As described above, the saturation correction coefficient is determined from the image data of one pixel of each individual pattern of the standard pattern. However, more accurate saturation correction can be performed by determining the saturation correction coefficient from the average value of the image data of a plurality of pixels of one individual color pattern.

As mentioned above, the saturation correction coefficient Kj is determined in pre-scanning, and when performing main scan the saturation correction is performed on the image data of each pixel of the original.

The image data of r, g, and b read in the main scan are written in the frame memory 55 after shading correction, read out by the saturation correction unit 57, converted into the color region signals v, α, and β by the HVC converter 571, and inputted into the saturation correction processing unit 576. The value of H* is used for color region discrimination by the color region discriminator 574.

The CPU 70 selects the relevant saturation correction coefficient Kj from the RAM 72 according to the color region information, and sends it to the saturation correction processing unit 576.

In accordance with the saturation correction coefficient Kj, the saturation correction processing unit 576 determines a new correction coefficient Xj expressed by a 3×3 determinant of Equation (4).

$$Xj = \begin{pmatrix} Kj & 0 & 0 \\ 0 & Kj & 0 \\ 0 & 0 & 1 \end{pmatrix} \quad (4)$$

Using the correction coefficient Xj, the color region signals v, α, and β are subjected to conversion shown by Equation (5) to obtain saturation-corrected color region signals v', α', and β'.

$$\begin{pmatrix} \alpha' \\ \beta' \\ v' \end{pmatrix} = Xj \begin{pmatrix} \alpha \\ \beta \\ v \end{pmatrix} \quad (5)$$

In Equation (5), v'=v, α'=Kj·α, and β'=Kj·β. Point P is moved to point P' in the HCV color space, as shown in FIG. 7.

As the relationship between α, β and the saturation C* can be shown by Equation (6), the saturation C* after the correction can also be expressed by Equation (6).

$$\begin{aligned} C^{*\prime} &= (\alpha'^2 + \beta'^2)^{1/2} \\ &= \{(Kj \cdot \alpha)^2 + (Kj \cdot \beta)^2\}^{1/2} \\ &= Kj(\alpha^2 + \beta^2)^{1/2} \\ &= Kj \cdot C^* \end{aligned} \quad (6)$$

Meanwhile, as shown in Equation (3), the hue (H*) takes β/α as a variable, the value of which does not change by multiplying each of α and β by Kj, and therefore H*' is equal to H*. Accordingly, only the saturation is corrected without changing the hue.

The color region signals v', α', and β' obtained by performing saturation correction by the saturation correction processing unit 576 are converted into image data of r', g', and b' in accordance with Equation (7) by a reverse HVC converter 577 which performs conversion reverse to Equation (1).

$$\begin{pmatrix} r' \\ g' \\ b' \end{pmatrix} = \begin{pmatrix} a_{11} & a_{12} & a_{13} \\ a_{21} & a_{22} & a_{23} \\ a_{31} & a_{32} & a_{33} \end{pmatrix}^{-1} \times \begin{pmatrix} \alpha' \\ \beta' \\ v' \end{pmatrix} \quad (7)$$

The image data of r', g', and b' are outputted to the log converter 58.

As described so far, when the original is a hard copy, the saturation correction is performed according to the printed standard pattern. However, in the case where the original is an initial original and no standard pattern has been detected, the CPU 70 reads out the standard corrective coefficient Ksj for each color region from the ROM 71, stores each coefficient in the RAM 72, and instructs the saturation correction processing unit 576 to perform saturation correction on the image data according to the standard values in the same manner as described above.

(1-4) Operations of the Digital Color Copying Machine

Figure 9:
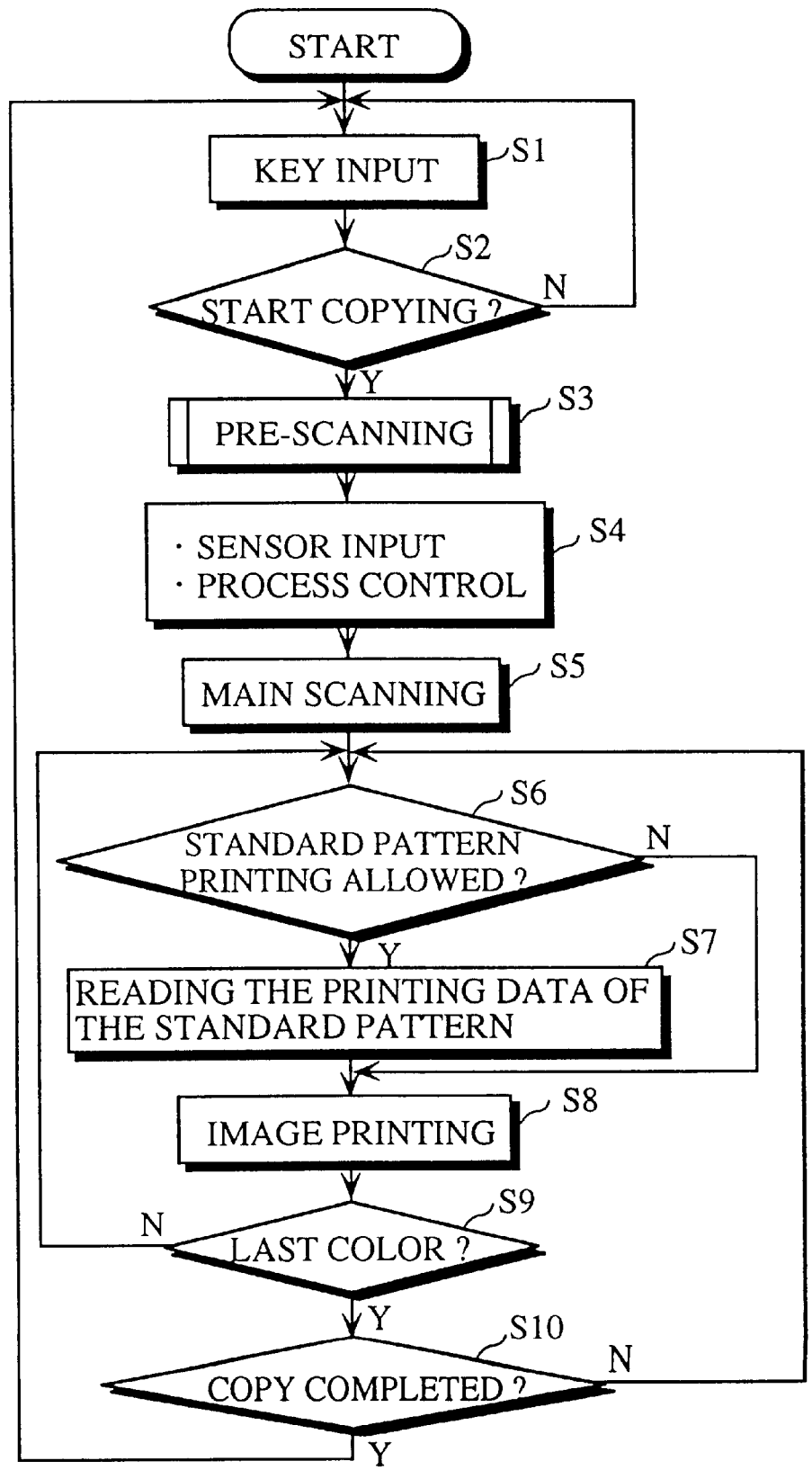
FIG. 9 is a flowchart showing a copying operation of the digital color copying machine of the present invention.
Figure 10:
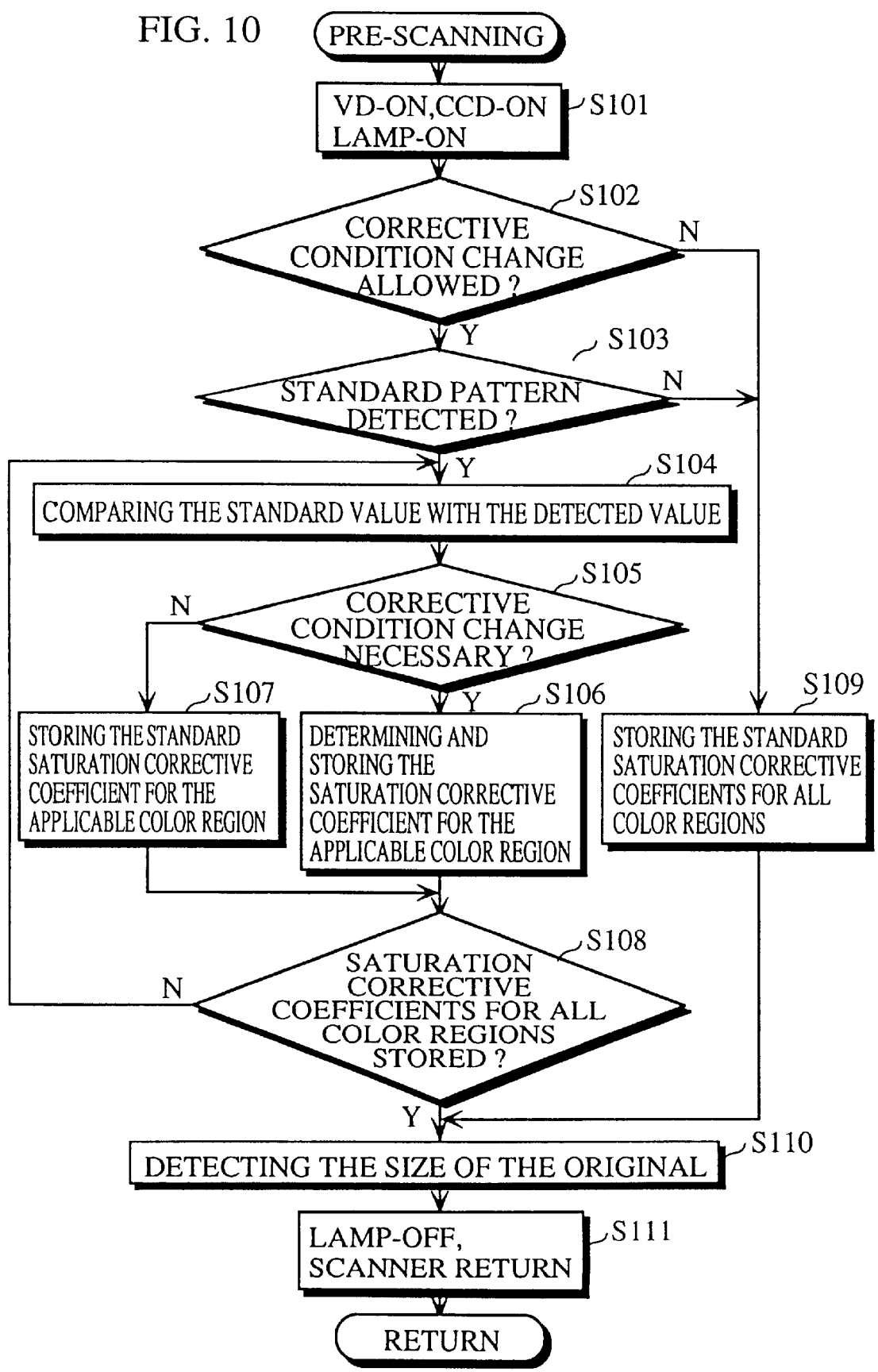
FIG. 10 is a flowchart showing a pre-scanning operation of the digital color copying machine of the present invention.

The following is an explanation of the operations of the digital color copying machine of the above structure, with reference to the flow charts in FIGS. 9 and 10.

Using the keys of the operation panel 18, the user can determine copying conditions such as the magnification, the number of copies, whether the standard pattern printing is necessary or not, and whether a change in the saturation corrective conditions is allowable or not (step S1). By pressing the start key (step S2), pre-scanning is started (step S3).

FIG. 10 is a flowchart showing the pre-scanning operation of step S3 in detail.

In this flowchart, the image reader control unit 110 sends a CCD signal to instruct the scanner 11 to apply a voltage to the CCD sensor 14 (CCD-ON), sends a VD signal to instruct the CCD sensor 14 to start outputting the image data (VD-ON), switches the exposure lamp 12 on (LAMP-ON), and starts the pre-scanning (step S101).

The image data on the colors obtained by pre-scanning the original is subjected to shading correction, and then written in the frame memory 55.

Unless the user has instructed not to change the corrective conditions using the operation panel 18, it is determined that the corrective conditions can be modified (step S102), and the standard pattern detection unit 56 retrieves the image data written in the frame memory 55 and informs the CPU 70 that the standard pattern has been detected (step 103).

Upon receipt of this information, the CPU 70 determines that the original is a hard copy, enters the generation mode, and instructs the saturation correction unit 57 to modify the saturation corrective conditions.

As mentioned before, the saturation correction unit 57 reads out the image data of r, g, and b for each pixel of the individual pattern of each color, converts them into the color region signals in the HVC color space, decides to which color region each color region signal belongs, determines the saturation value, and compares the saturation value with the saturation standard value of the applicable color region (step S104). If the saturation of the individual pattern has become lower than the standard value, it is judged that the saturation corrective condition needs to be changed, and the saturation corrective coefficient calculation unit 575 determines the saturation corrective coefficient Kj, which is stored in the RAM 72 (steps S105 and S106).

If the re is no decrease in saturation, the saturation corrective condition needs no change, and the CPU 70 reads out the standard saturation corrective coefficient Ksj for the applicable color region from the ROM 71 and stores it in the RAM 72 (steps S105 and S107).

The steps S104 to S107 are repeated for all the color regions, and when the saturation corrective coefficients for all the color regions have been stored in the RAM 72, the original size is detected from the data in the frame memory 55 (steps S108 and S110). The exposure lamp is switched off (LAMP-OFF), the scanner 11 is returned to the home position (SCANNER RETURN), and finally, the pre-scanning is finished (step S111).

Meanwhile, if the user has decided that the saturation corrective condition needs no change in step S102, or if the standard pattern has not been detected in step S103, the CPU 70 reads out the standard saturation corrective coefficient Ksj stored in the ROM 71 for each color region, and stores it in the RAM 72 (step S109).

Returning to step S4 of FIG. 9 after the pre-scanning, sensor input and process control are performed.

In the digital color copying machine mentioned so far, a latent image is formed on the surface of the photosensitive drum 22, the toner of each color is stuck to the surface of the photosensitive drum 22 by means of the electrostatic force, and then the toner image is transferred onto a copying paper. For this reason, the quality of the reproduction image depends largely on the amount of electrostatic charge of the toners and the photosensitive member. Since the amount of electrostatic charge is not influenced by the temperature or humidity of the surroundings, the temperature and the humidity inside the copying machine are detected by a temperature sensor and a humidity sensor (not shown), and the electric potential of the photosensitive member and the amount of toners of the pattern (AIDC pattern) formed on the surface of the photosensitive drum are also detected. All of the detected values are inputted into the printer control unit 130 (sensor input).

According to the detected values, the printer control unit 130 suitably changes image forming conditions (process control), such as Vo (the surface potential of the photosensitive drum), VB (developing bias potential), the laser diode amplification factor, and the gamma correction value set in a gamma table, and then main scanning is performed (steps S4 and S5).

In the main scanning, the image data obtained by performing color separation on the original are subjected to image processing including the saturation correction by the image signal processing unit 120, and outputted to the printer control unit 130.

At this stage, whether the printing of the standard pattern is necessary or not is judged first (step S6). If the printing of the standard pattern is not prohibited in advance via the operation panel 18, the CPU 70 reads the printing data on the reproduction colors of the standard pattern from the ROM 71, and sends them to the printer control unit 130 (step S7). After that, image forming is performed according to the printing data of the standard pattern and to the image data which have been subjected to the above-mentioned image processing (step S8).

Such printing operation is repeated for each of the color C, M, Y, and K, and when the printing of all the reproduction colors has been finished, a first copy is completed (step S9).

The printing of the standard pattern according to the printing data from the ROM 71 is performed only when the first generation copy is made from an initial original. In making newer generation copies, the standard pattern is not printed using the printing data from the ROM 71, but the standard pattern printed in the first generation is regarded as a part of the image.

A newer generation copy of the standard pattern is made one after another, and a decrease in saturation of a generation copy can be measured by reading the copied standard pattern. Thus, precise saturation correction can be performed for each generation copy.

If a plurality of copies are to be made, steps S6 to S9 are performed for each copy until the next key input (step S10).

If the printing of the standard pattern is prohibited in step S6, it is not performed in step S7. In the case where an initial original image is copied, there is no need to keep a margin for the standard pattern, and therefore a larger image printing space can be prepared. So the magnification may be automatically changed to enlarge the reproduction image by the magnification change unit 62 (shown in FIG. 3).

(2) Second Embodiment

In the first embodiment of the present invention, the saturation correction is performed using the saturation corrective coefficient determined by comparing the saturation value of the standard pattern with the predetermined standard saturation value. In this embodiment, however, the saturation correction is performed by changing the proportions of the processes by the UCR/BP processing unit and the masking unit.

As the overall structure of the color digital copying machine of this embodiment is substantially the same as in the first embodiment, the following explanation is only for the image signal processing unit which has the characteristics of its own.

(2-1) Structure of the Image Signal Processing Unit

Figure 11:
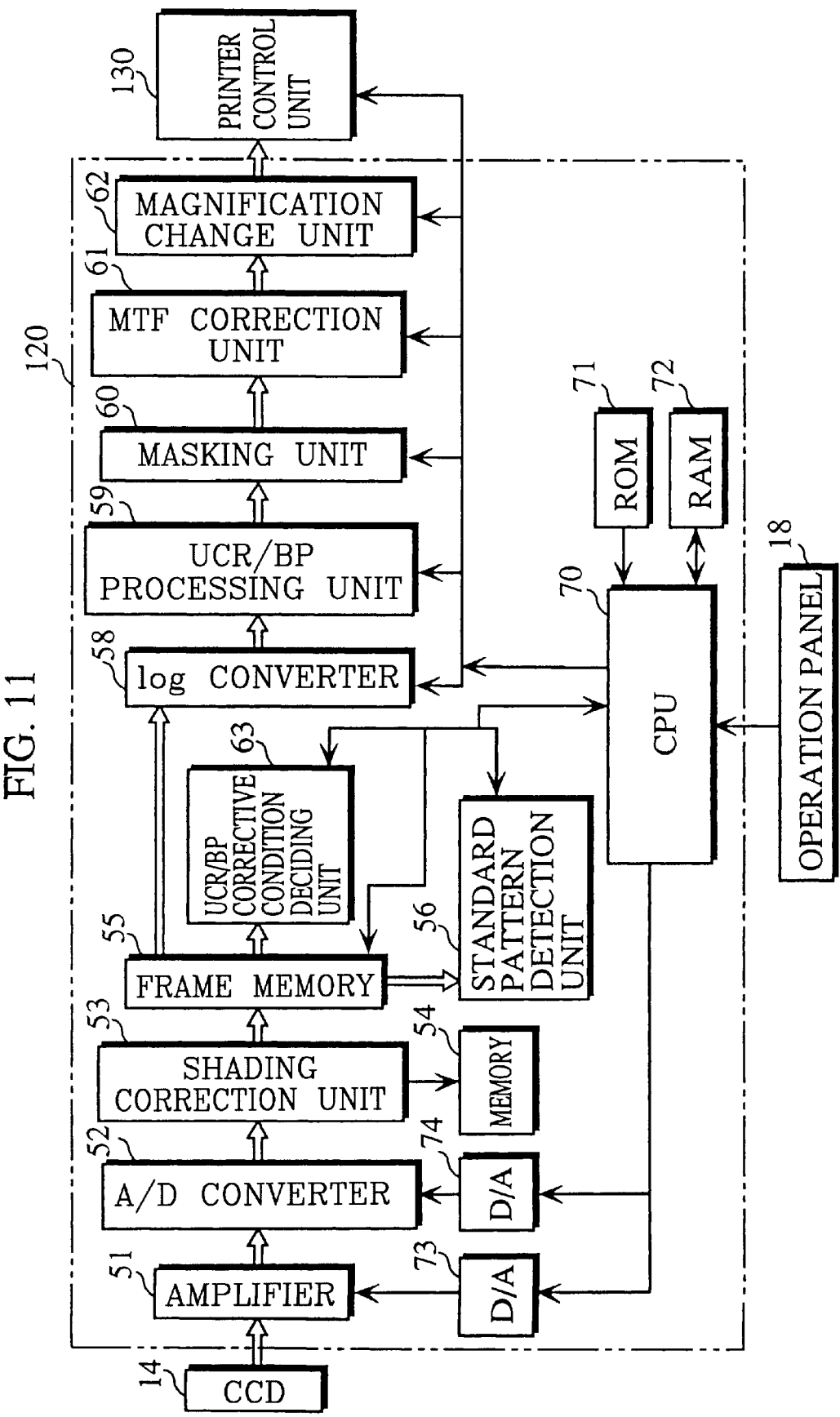
FIG. 11 is a block diagram of the image signal processing unit in a digital color copying machine in a second embodiment of the present invention.

FIG. 11 is a block diagram of the image signal processing unit 121 of this embodiment. In this figure, the same elements as shown in FIG. 3 are indicated by the same reference numerals, and therefore explanations for them are not provided.

The image signals photoelectrically converted by the CCD sensor 14 in the scanner 11 are amplified by an amplifier 51, and converted into multi-valued digital image data of R, G, and B by an A/D converter 52. The digitized image data are then subjected to shading correction by a shading correction unit 53 to correct uneven irradiation by the exposure lamp 12 and irregular sensitivity of the CCD sensor 14.

Each of the image data of R, G, and B which have been subjected to shading correction is temporarily stored in a frame memory 55.

In the case where the image read by the CCD sensor 14 is a copied image by the same copying machine, the standard pattern detection unit 56 detects the image data of the standard pattern stored in the frame memory 55, and informs the CPU 70 that the standard pattern has been detected.

As the original is judged to be a hard copy from the above information, the CPU 70 enters the generation mode, and instructs the UCR/BP corrective condition deciding unit 63 to set corrective coefficients and constants used in the processes by the UCR/BP processing unit 59 and the masking unit 60.

As mentioned before, the saturation correction is performed by changing the condition of each of the processes by the UCR/BP processing unit 59 and the masking unit 60. The description below is of the UCR (undercolor removal) process, the BP (black paint) process, and the masking process carried out by the UCR/BP processing unit 59 and the masking unit 60, followed by an explanation of the operation of the UCR/BP corrective condition deciding unit 63.

The UCR/BP processing unit 59 generates black as described above. This black generation is necessary, because pure black is hard to reproduce by the overlapping of C, M, and Y toners, due to the adverse influence of the spectral characteristics of each toner. Also, the toners of C, M, and Y are costly, and therefore the consumption of them should be restrained.

The black generation is performed as follows.

The density data DR, DG, and DB obtained by a log converter 58 represent the densities of R, G, and B, and therefore equal to the density data of cyan, magenta, and yellow, which are complementary to R, G, and B.

Figure 12:
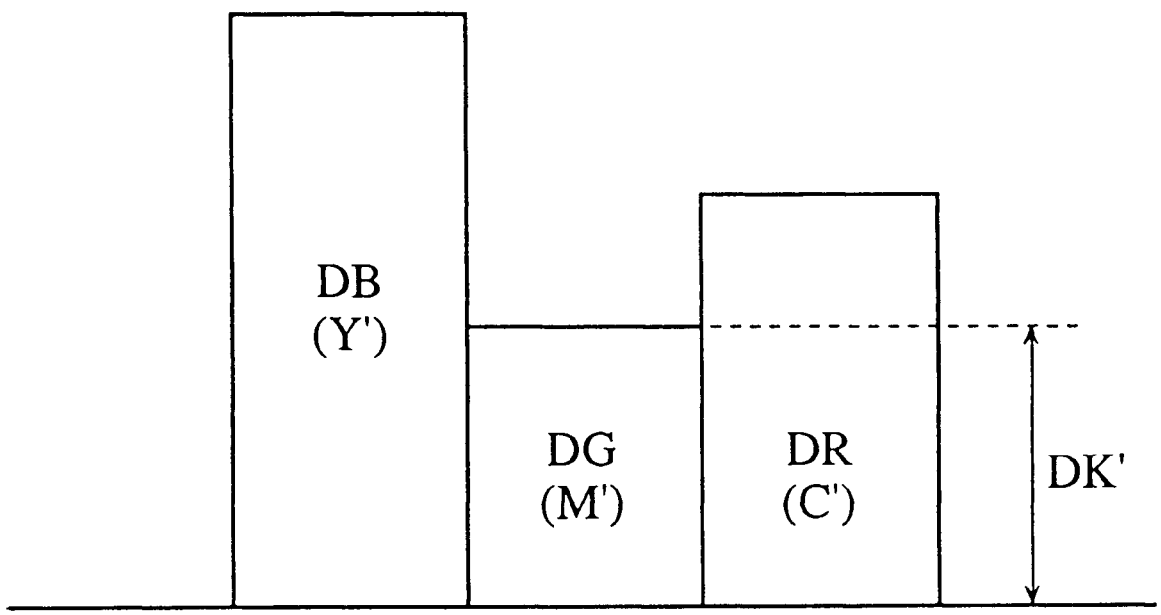
FIG. 12 is an explanatory drawing for undercolor removal and black generation.

As black can be obtained by overlapping cyan, magenta, and yellow, the black density DK' is considered to be the minimum of DB(Y'), DG(M'), and DR(C'), as shown in FIG. 12. This relationship can be expressed by DK'=MIN (DR, DG, DB).

Since the black density DK' is the common portion among DR, DG, and DB, each value of the density data of C, M, and Y is logically equal to the value obtained by subtracting the density data DK' from each density data of C', M', and Y'. As can be seen from the example in FIG. 12, however, the density of each color is extremely low, and the black stands out in the reproduction image, which has extremely low saturation as a result.

In practice, UCR process and BP process are performed using corrective coefficients t and u, and constants p and q, as in the following equations.

(UCR process)

$$DR' = DR - t\{MIN(DR, DG, DB) - p\}$$

$$DG' = DG - t\{MIN(DR, DG, DB) - p\}$$

$$DB' = DB - t\{MIN(DR, DG, DB) - p\}$$

In these equations, when {MIN(DR, DG, DB)−p} is less than 0, {MIN(DR, DG, DB)−p} is set at 0.

(BP process)

$$DK' = u\{MIN(DR, DG, DB) - q\}$$

In this equation, when {MIN(DR, DG, DB)−q} is less than 0, {MIN(DR, DG, DB)−p} is set at 0.

The corrective coefficient t is called a UCR ratio, while the corrective coefficient u is called a BP ratio. (Hereinafter, the combination of the UCR process and the BP process will be referred to simply as "UCR/BP process", as they are usually performed together.)

Each of the density data of DR', DG', DB', and DK' obtained by the UCR/BP processing unit 59 are inputted into a masking unit 60 and converted into the density data of the reproduction colors C, M, Y, and K.

As described above, R, G, and B are complementary to C, M, and Y. In practice, however, the transmission characteristics of the filters for R, G, and B in the CCD sensor 14 do not change proportionally to the reflection characteristics of the toners of C, M, and Y in the printing unit. Therefore, it is necessary to match both characteristics with one another, so that the color reproducibility becomes as high as possible. This correction is performed by the masking unit 60.

The masking unit 60 performs linear correction on the data of DR', DG', and DB' using a making coefficient M shown by Equation (8) and a masking equation shown by Equation (9) to convert them into the data of the three reproduction colors C, M, and Y.

$$M = k \begin{pmatrix} m_{11} & m_{12} & m_{13} \\ m_{21} & m_{22} & m_{23} \\ m_{31} & m_{32} & m_{33} \end{pmatrix} \quad (8)$$

$$\begin{pmatrix} C \\ M \\ Y \end{pmatrix} = M \begin{pmatrix} DR' \\ DG' \\ DB' \end{pmatrix} \quad (9)$$

Each element of $m_{11}$–$m_{33}$ of the masking coefficient M in Equation (8) is determined from the transmission characteristics of the filters and the reflection characteristics of the toners. The density corrective coefficient k compensates the overall density level which has been lowered through the UCR process. The black density DK', which has no need to be converted, is taken as th black density K.

The UCR/BP process is primarily performed to improve the black reproducibility and to restrain the consumption of toners of C, M, and Y. Besides these objects, however, the UCR/BP process in this embodiment is also performed to compensate the saturation decrease caused by generation copying.

The saturation correction is carried out by removing impurity from a generation copy with a large amount of UCR, and by reducing muddiness caused by the black toner with a small amount of BP. The density correction is carried out by performing masking with the density coefficient k changed by the decrease of the overall density due to the large amount of UCR. By doing so, the saturation is modified, and the overall density is maintained at the same level.

As described above, since the amount of UCR and the amount of BP depend on the corrective coefficients t and u, and the constants p and q (hereinafter, u, t, p, and q will be collectively referred to as "UCR/BP corrective coefficients"), and the density correction is determined from the density corrective coefficient k, the saturation corrective condition can be changed by altering the UCR/BP corrective coefficients and the density corrective coefficient.

The UCR/BP corrective condition deciding unit 63 (shown in FIG. 11) decides the saturation corrective condition for each color region to perform necessary saturation correction.

Figure 13:
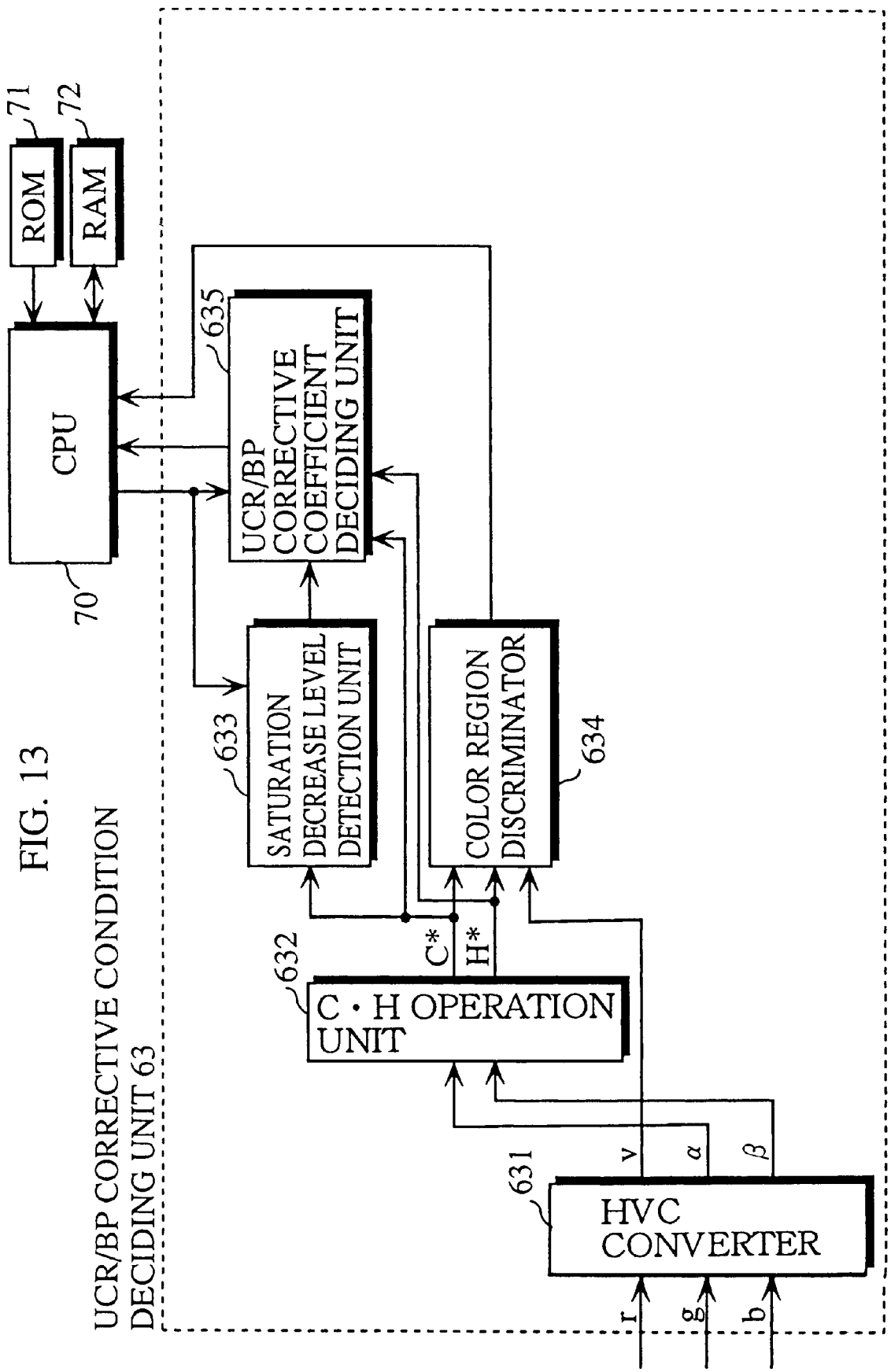
FIG. 13 is a block diagram of a UCR/BP corrective condition deciding unit in the image signal processing unit.

FIG. 13 is a block diagram of the UCR/BP corrective condition deciding unit 63. As in FIG. 6, the flow of the image data indicated by solid line arrows for each color or each color signal to fully describe the process of the image data transformation.

As shown in the figure, the UCR/BP corrective condition deciding unit 63 comprises an HVC converter 631, a C·H operation unit 632, a saturation decrease level detection unit 633, a color region discriminator 634, and a UCR/BP corrective coefficient deciding unit 635. The operations of these components except the UCR/BP corrective coefficient deciding unit 635 are the same as described in FIG. 6.

The standard pattern detection unit 56 (shown in FIG. 11) retrieves the image data written in the frame memory 55 when pre-scanning, and detects the image data of the standard pattern 203. Upon receipt of the information about the detection of the standard pattern and its position in the frame memory 55, the CPU 70 instructs the UCR/BP corrective condition deciding unit 63 to determine the UCR/BP corrective coefficient and density coefficient for each color region in accordance with the image data of the standard pattern 203.

The UCR/BP corrective coefficient deciding unit 635 reads out the rgb image data of a pixel of an individual pattern in the standard pattern 203 stored in the frame memory 55 (or it reads out the image data of a plurality of pixels and determines the average of them for each color). The HVC converter 631 converts the image data into color region signals v, α, and β in a coordinate system of a uniform color space. According to α, and β, the C·H converter 632 determines the values of the saturation (C*) and the hue (H*).

The color region discriminator 634 determines to which color region the read-out image data belongs according to the value of the hue (H*), and sends the determined result to the CPU 70.

In the ROM 71, the standard saturation Crj for each color region of the standard pattern 203 is stored. According to the color region information from the color region discriminator 634, the CPU 70 sends the data of the standard saturation Crj of the corresponding color region to the saturation decrease level detection unit 633.

When the image data is read from the individual pattern of red (R), for instance, the red standard saturation CrR is sent to the saturation decrease level detection unit 633 and compared with the value of the saturation obtained by reading the individual standard pattern of R, and only if the saturation value of the individual standard pattern of R has become lower than the standard saturation CrR of R, a saturation decrease signal is sent to the CPU 70.

Upon receipt of the saturation decrease signal, the CPU 70 instructs the UCR/BP corrective coefficient deciding unit 635 to determine the UCR/BP corrective coefficient and the density corrective coefficient for the color region of R. (Since the density corrective coefficient compensates the overall density lowered through the UCR process depending on the UCR/BP corrective coefficient, both coefficients will be hereinafter collectively referred to as "UCR/BP conditions".)

Figure 14:
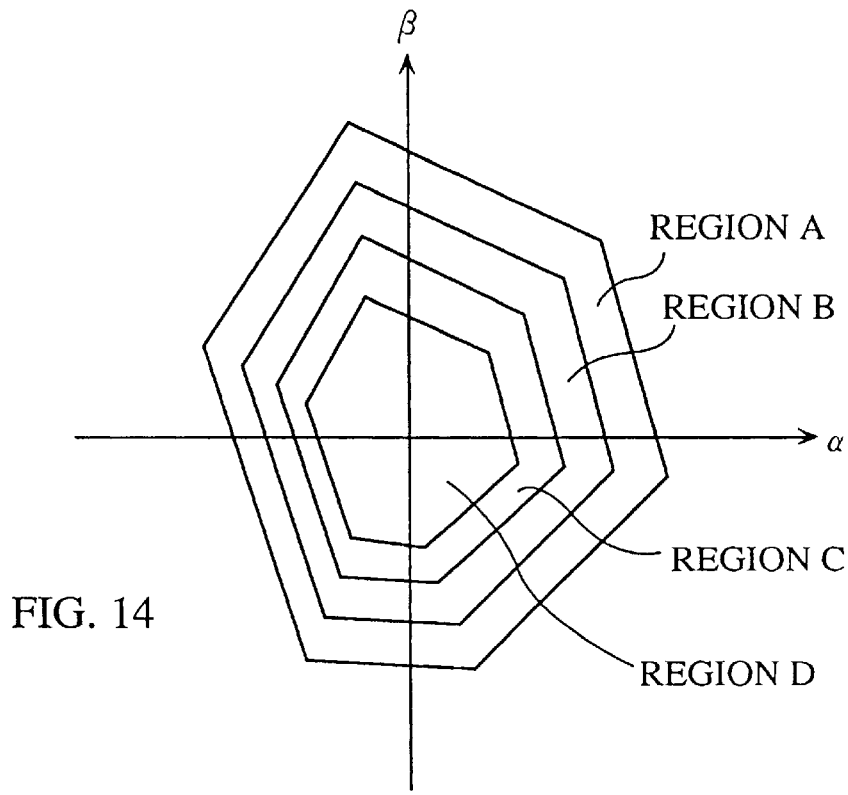
FIG. 14 shows a model reproduction color regions set in the UCR/BP corrective coefficient deciding unit in the UCR/BP corrective condition deciding unit.
Figure 15:
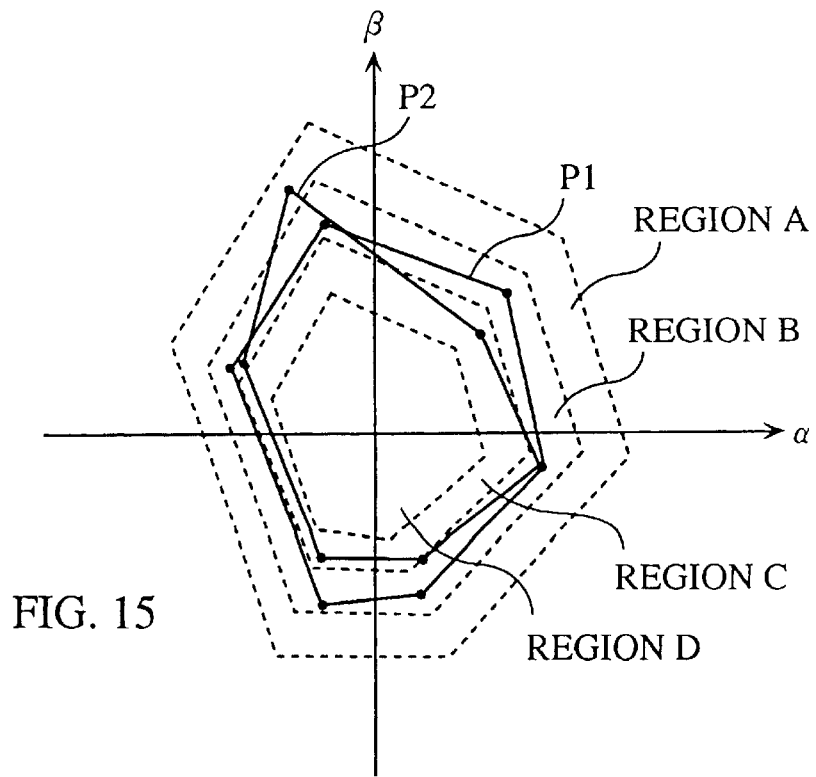
FIG. 15 shows an example case where the data obtained by reading the standard pattern are plotted in the reproduction color regions.

FIGS. 14 and 15 are drawings for explaining the deciding criteria of the UCR/BP corrective conditions. FIG. 14 shows the color reproduction regions A to D represented on an αβ plane (shown in FIG. 7) in the HVC color space. (Each color reproduction region does not include the inner portion which overlaps with an inner color reproduction region.)

In this figure, the region A corresponds to the color reproduction region of the standard data of each color of the standard pattern stored in the ROM 71. If the image data obtained by reading the standard pattern of the original, no saturation correction is necessary.

As described above referring to FIG. 7, the saturation (C*) is represented by the distance from the origin on the αβ plane, and inner color reproduction regions B–D have lower saturation. Accordingly, the level of the saturation correction in the UCR/BP process (hereinafter referred to as UCR/BP processing level) should be higher.

The image data of a certain pixel (the central pixel of each individual pattern, for instance) of each color except black (K) is read from the frame memory 55, and then plotted on the αβ plane according to the values of the hue (H*) and the saturation (C*). Depending on to which color reproduction region the plot belongs, the UCR/BP processing level is determined.

FIG. 15 shows an example of such plot. If the plot of the image data of the standard pattern is P1, all the colors of the standard pattern are within the region B.

Figures 16, 18:
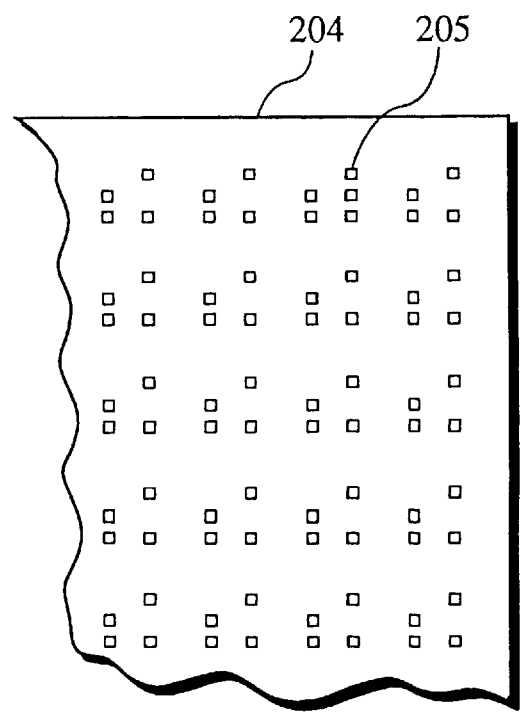
FIG. 16 shows a table for determining the UCR/BP corrective coefficient and the density corrective coefficient in accordance with the reproduction color regions.
FIG. 18 shows an example standard pattern of a digital color copying machine in a third embodiment of the present invention.

In the UCR/BP corrective coefficient deciding unit 635, the UCR/BP processing levels, the UCR/BP corrective coefficients, and the density corrective coefficients for all the color reproduction regions A to D are stored in a table Tb2 as shown in FIG. 16. If the plot formed according to the image data of the standard pattern is within the region B as shown by P1 in FIG. 15, the UCR/BP processing level is "+1", and the UCR/BP corrective coefficients (t1, u1, p1, q1) and the density corrective coefficient (k1) are selected. The CPU 70 stores the UCR/BP processing level and the corrective coefficients in the RAM 72. According to these values, the UCR/BP corrective condition for the color region of R is determined. As for the rest of the color regions, the UCR/BP corrective condition is determined in the same manner.

In this embodiment, when determining the UCR/BP corrective conditions for one color region, the image data of all the colors of the standard pattern (except for black, which is an achromatic color) are plotted on the αβ plane, and according to the belonging color reproduction region of the plot, the saturation correcting level is determined. The reason for doing so is that this embodiment, unlike the first embodiment, employs a method of correcting saturation by changing the conditions of the UCR/BP process and the masking process, and the saturation correcting level is hard to determine on the basis of one color region, since the UCR/BP process and the masking process are carried out collectively on the density data of R, G, and B.

Also, the plot of the image data represented on the αβ plane does not necessarily stay within one color reproduction region. If the plot is formed as shown by P2 in FIG. 15, for instance, the correcting level of the region in which most of the plot is included should be selected. If the saturation is prioritized, the correcting level of the region having the lowest saturation should be selected. According to the levels, the UCR/BP corrective coefficients and the density corrective coefficient are determined with reference to the table Tb2.

FIGS. 14 and 15 only show the deciding criteria of the UCR/BP processing level. In practice, the UCR/BP processing level is determined by inputting the saturation (C*) and the hue (H*) into comparators in which equations representing the boundaries between the color reproduction regions are set, where the saturation and the hue are compared.

The UCR/BP corrective conditions determined for each color region of the standard pattern as described above are stored in RAM 72 by the CPU 70.

In the above explanation, the saturation correction is performed in the case where the original is a hard copy and the standard pattern is printed. However, if the original is an initial original and no standard pattern is detected, the standard UCR/BP level in the table 2 in FIG. 16 is applied to all color regions, and the CPU 70 stores the corresponding UCR/BP corrective coefficient (t0, u0, p0, q0) and the density corrective coefficient (k0) in the RAM 72.

Meanwhile, as the image data written in the frame memory 55 are still the reflectance data of the original at this stage, the image data are subjected to log conversion by the log converter 58, and converted into the density data of the actual image. The density data are subjected to saturation correction by the UCR/BP processing unit 59 and the masking unit 60 according to the corrective conditions determined by the UCR/BP corrective condition deciding unit 63. The corrected density data are then subjected to smoothing with two-dimensional spatial filters by the MTF (modulation transfer function) correction unit 61, and sent to the magnification change unit 62, where the magnification of the reproduction image is changed to a different magnification set by the user in advance. The density data are finally outputted to the printer control unit 130.

Since the saturation correction is achieved by changing only the conditions used by the UCR/BP processing unit 59, this embodiment has the advantage that a special saturation correction unit, such as the saturation correction processing unit 576 (shown in FIG. 6) of the first embodiment, is not necessary.

(2-2) Operations of the Digital Color Copying Machine

Figure 17:
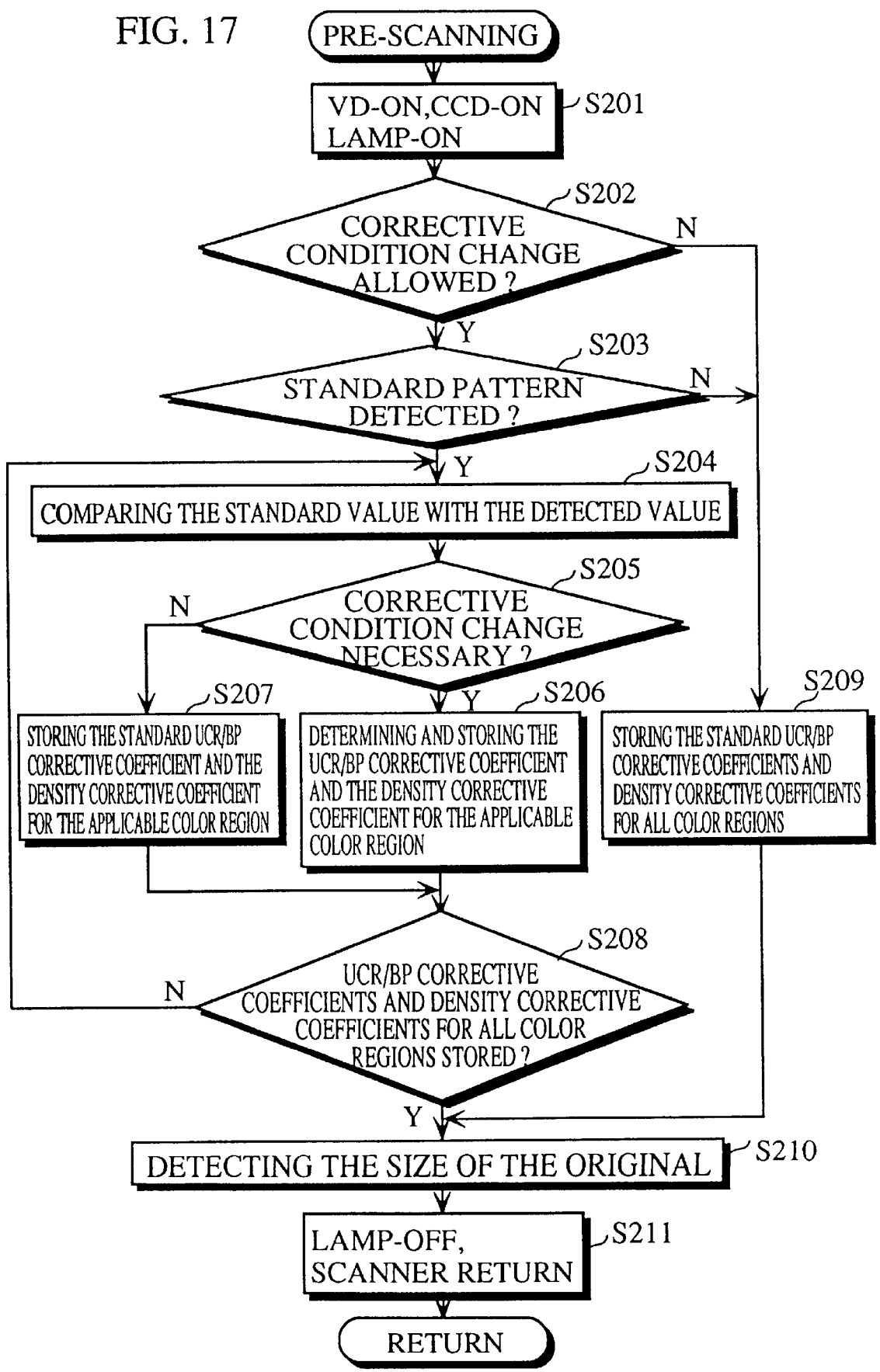
FIG. 17 is a flowchart showing the pre-scanning operation of the digital color copying machine.

The operations of the digital color copying machine having the structure as described above are substantially the same as in the first embodiment shown in FIG. 9. However, the pre-scanning operation in this embodiment is markedly different from the pre-scanning in FIG. 10. So, the following explanation is for the pre-scanning operation in this embodiment, with reference to the flow chart in FIG. 17.

Firstly, the image reader control unit 110 instructs the scanner 11 to apply a voltage to the CCD sensor 14 (CCD-ON), a VD signal is generated to stimulate the output of the image data from the CCD sensor 14 (VD-ON), the exposure lamp 12 is switched on (LAMP-ON), and pre-scanning is then started (step S201).

The color image data obtained by scanning the original are subjected to shading correction, and written in the frame memory 55.

If the user has not sent an instruction to make "no corrective condition change", it is judged that a change of the corrective condition is allowed, and the standard pattern detection unit 56 retrieves the image data written in the frame memory 55 (step S202). If the image data of the standard pattern 203 has been detected, the standard pattern detection unit 56 informs the CPU 70 of the detection result (step S203).

Upon receipt of the information, the CPU 70 determines that the original is a hard copy. It then enters the generation mode, and instructs the UCR/BP corrective condition deciding unit 63 to determine the UCR/BP corrective coefficient and the density corrective coefficient.

The UCR/BP corrective condition deciding unit 63 converts the image data of R, G, and B of an individual pattern of the standard pattern 203 into color region signals in a uniform color space, determines to which color region each image data belongs, and compares the saturation of the individual pattern with the standard saturation of the standard pattern of the determined color region (step S204). If the saturation of the individual pattern has become lower than the standard value, it is judged that the saturation corrective condition for the color region needs to be changed.

The UCR/BP corrective coefficient deciding unit 635 determines the color reproduction regions (shown in FIG. 15), and according to the table Tb2 (shown in FIG. 16), it selects the UCR/BP corrective coefficient and the density corrective coefficient, which are then stored in the RAM 72 by the CPU 70 (steps S205 and S206).

If there is no saturation decrease detected in the image data of the individual pattern, the corrective condition for the color region does not need to be changed, so the standard corrective coefficients selected from the table Tb2 are directly stored in the RAM 72 without determining the UCR/BP processing level (steps S205 and S207).

The steps S204 to S208 are performed for each individual pattern to determine the UCR/BP corrective conditions for all the color regions. Once the UCR/BP processing level for one color region is determined, however, it can be applied to the saturation correction for other color regions, and there is no need to determine it again.

When the UCR/BP corrective conditions for all the color regions have been determined and stored in the RAM 72, the size of the original is determined from the data in the frame memory 55 (step S210), the exposure lamp 12 is switched off (LAMP-OFF), the scanner is returned to the home position (SCANNER RETURN), and the pre-scanning is finished (steps S210 and S211).

In the case where the user has sent an instruction to make "no saturation corrective condition change" or where no standard pattern has been detected in step S202, the CPU 70 selects the UCR/BP corrective coefficient and the density corrective coefficient for each color region and stores them in the RAM 72 (steps S202 and S209).

When the UCR/BP corrective condition for saturation correction for each color region and the size of the original have been determined, step S4 in FIG. 9 is performed. After the sensor input and process control, the image data of each pixel is read out by the main scanning, and the UCR/BP corrective condition determined for each color region is applied the image data. The UCR/BP processing unit 59 and the masking unit 60 perform the UCR/BP processing and the masking to make a correction in saturation of the image data of each color region. The image is then reproduced on a copying paper by the printing unit 20.

(3) Third Embodiment

In the first and second embodiments, the standard pattern of the colors, C, M, Y, R, G, and B is printed, the generation mode is set after detecting the standard pattern, a decrease in the saturation of each color is measured according to the image data of each color, and the saturation correction is performed in accordance with the saturation corrective conditions prescribed for each color. Although an accurate saturation correction can be performed to compensate the actual saturation decrease of each color region with the above method, the image printing area is a bit too small due to the margin for the printing of the standard pattern, and the standard pattern itself tends to catch unnecessary attention.

In this embodiment, a single-color standard pattern is printed within the image printing area, and the saturation correction is performed by reading the standard pattern.

More specifically, a standard pattern 205 formed by small dots shown in FIG. 18. The color of those dots is generally a quiet color, such as yellow (Y), but it is advisable to select the quietest color in contrast with the color tone of the original image.

By forming the standard pattern with small dots in a quiet color, the standard pattern can be printed in the image printing area without drawing the user's attention. Such method has the advantage that an image can be formed on the entire surface of a copying paper, because no margin for the printing of the standard pattern is necessary.

As the overall structure of the digital color copying machine having a function of printing the dot standard pattern is substantially the same as the structure of the copying machine of the first embodiment, the following is an explanation of the image signal processing unit which is characteristic of this embodiment.

(3-1) Structure of the Image Signal Processing Unit

Figure 19:
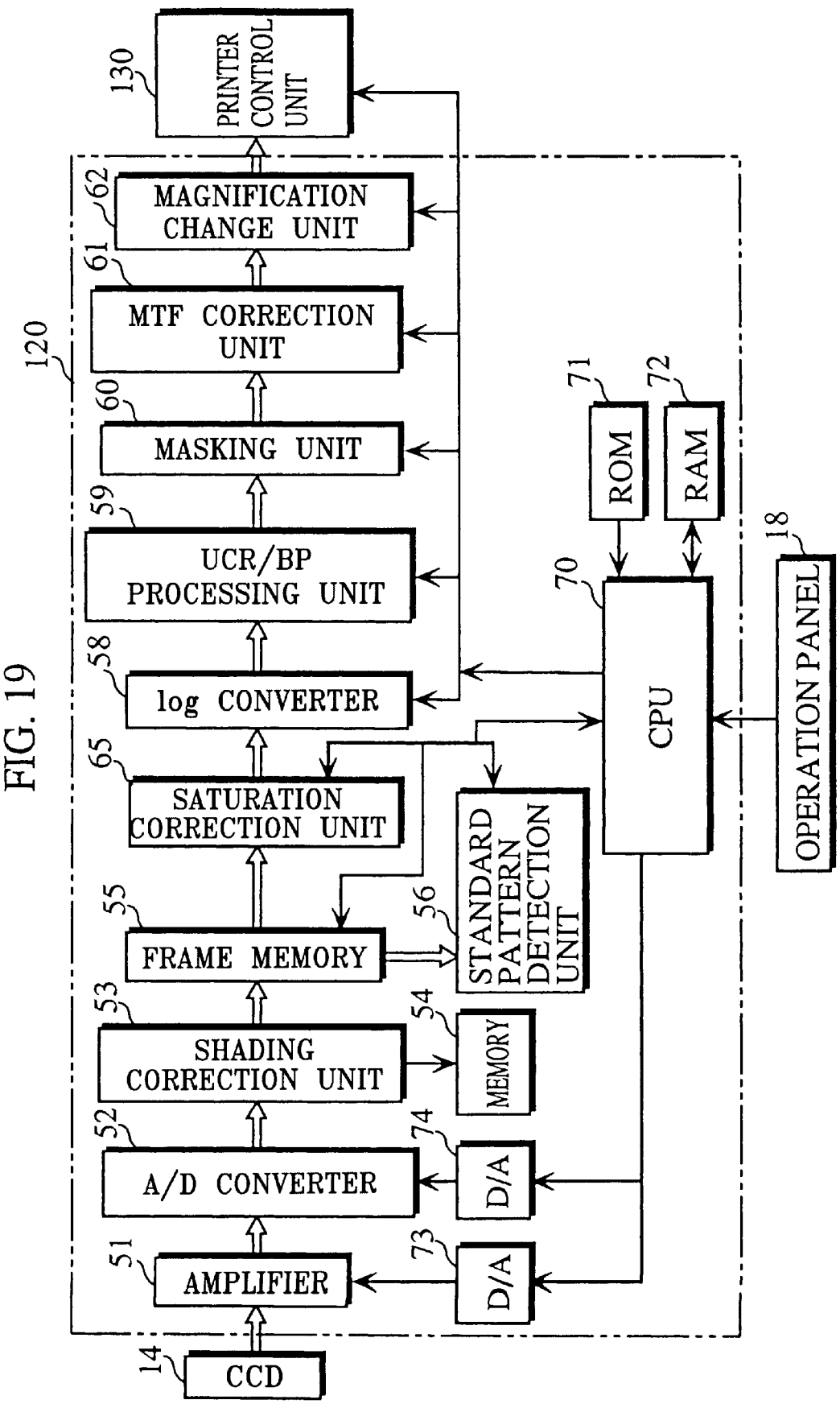
FIG. 19 is a block diagram of a image signal processing unit in the digital color copying machine of the present invention.

FIG. 19 is a block diagram of the image signal processing unit 120 in this embodiment. In this figure, the same elements as shown in FIG. 3 are indicated by the same reference numerals, and therefore explanations for them are not provided below.

The image signals photoelectrically converted by the CCD sensor 14 in the scanner 11 are amplified by an amplifier 51, and converted into multi-valued digital image data of R, G, and B by an A/D converter 52. The digitized image data are then subjected to shading correction by a shading correction unit 53 to correct uneven irradiation by the exposure lamp 12 and irregular sensitivity of the CCD sensor 14.

Each of the image data of R, G, and B which have been subjected to shading correction is temporarily stored in a frame memory 55.

In the case where the original read by the CCD sensor 14 is a hard copy made by the same copying machine, and where the user has not sent an instruction to prohibit the printing of the standard pattern when the hard copy is made, the dot standard pattern has already been printed by the printing unit 20. So, the standard pattern detection unit 64 detects the image data of the standard pattern from the data in the frame memory 55 and informs the CPU 70 that the standard pattern has been detected.

As the original is judged to be a hard copy from the above detection, the CPU 70 enters the generation mode and instructs the saturation correction unit 65 to perform saturation correction.

Figure 20:
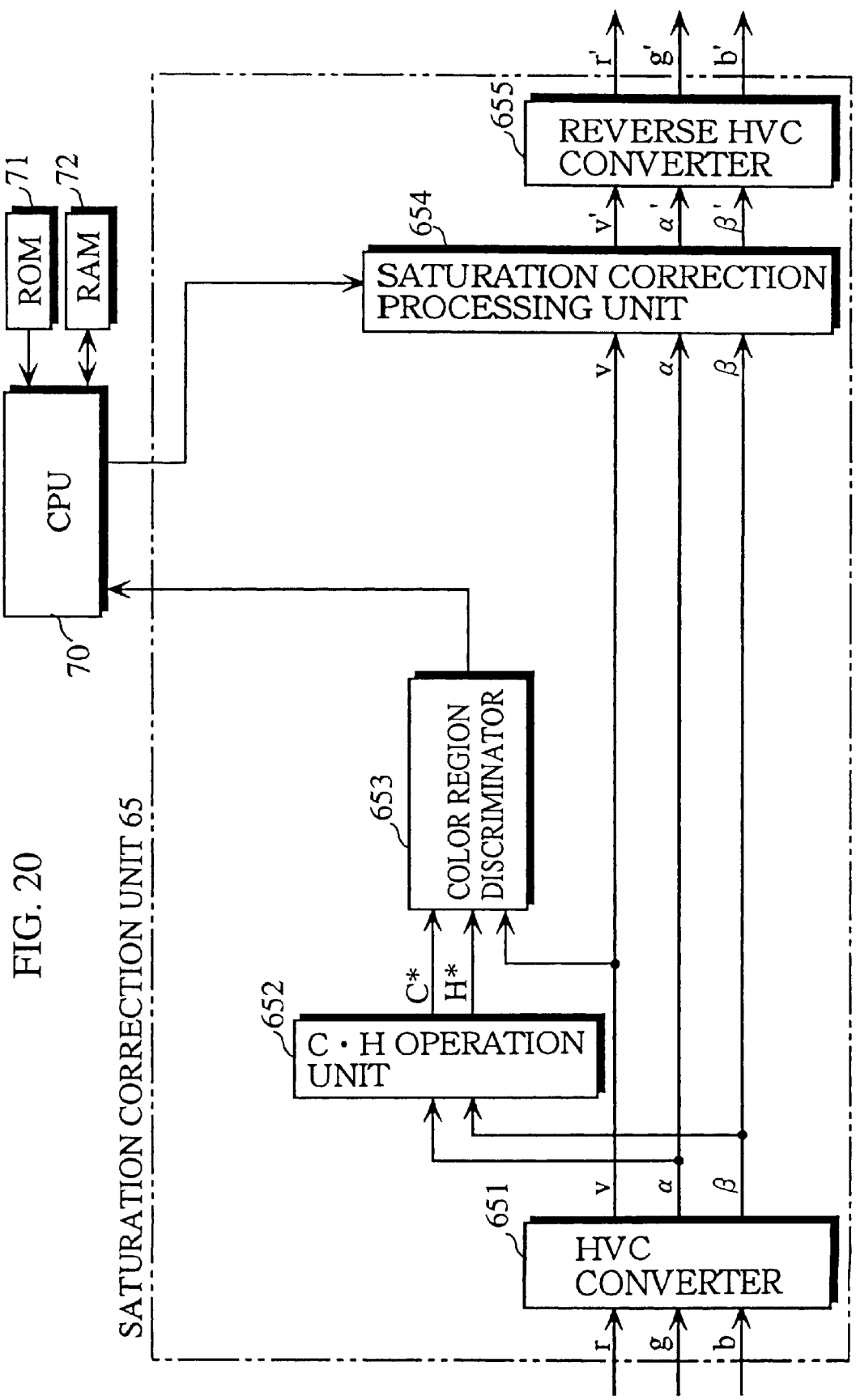
FIG. 20 is a block diagram of a saturation correction unit in the image signal processing unit.

FIG. 20 is a block diagram of the saturation correction unit 65. In this figure, the flow of the image data is indicated by solid lines and arrows to illustrate the process of the data conversion.

The saturation correction unit 65 consists of an HVC converter 654 for converting the image data of r, g, and b into data v, $\alpha$, and $\beta$ in an HVC color space, a C·H operation unit 652 for determining the saturation (C*) and the hue (H*) from the values of $\alpha$ and $\beta$, a color region discriminator 653 for determining to which color region the image data belongs from the value of the saturation (C*), a saturation correction processing unit 654 for performing saturation correction according to the saturation corrective coefficient given by the CPU 70, and a reverse HVC converter 655 for converting the color region signals which have been subjected to saturation correction back into the image data of r, g, and b.

In the ROM 71, a standard saturation corrective coefficient Ksj used for an initial original, and a saturation corrective coefficient Kgj used for a generation copy are stored in advance. When the CPU 70 is in the generation mode, the saturation corrective coefficient Kgj for each color region is read from the ROM 71 and stored in the RAM 72.

When the standard pattern has not been detected, the standard saturation corrective coefficient Ksp is read from the ROM 71 and stored in the RAM 72.

With the saturation corrective coefficient for each color region set upon pre-scanning, the image data of r, g, and b of each pixel data stored in the frame memory 55 upon main scanning are read out. The image data of r, g, and b are converted into the color region signals v, $\alpha$, and $\beta$ in a uniform color space by the HVC converter 651 using Equation (1).

The C·H operation unit 652 determines the saturation (C*) and the hue (H*) from the values of $\alpha$ and $\beta$ in accordance with Equations (2) and (3).

As in the first and second embodiments, the color region discriminator 653 determines to which color region the image data belongs referring to the table Tb1 in FIG. 8, and informs the CPU 70 of the determined result as the color region information.

The CPU 70 sends the saturation corrective coefficient corresponding to the determined color region from the RAM 72 to the saturation correction processing unit 654, where the color region signals v, $\alpha$, and $\beta$ are subjected to correction using Equations (4) and (5). The reverse HVC converter 655 reversely converts the color region signals into data of R, G, and B (hereinafter referred to as image data r', g', and b') using Equation (7).

The image data which have been subjected to saturation correction are still the reflection data of the original at this stage, so they are subjected to log conversion by the log converter 58 and converted into the density data of the actual image. As described in the above embodiments, the UCR/BP processing unit 59 conducts the BP (black paint) process to improve the black reproducibility by taking the common portion among the density data of R, G, and B as the black density. It also conducts the UCR (undercolor removal) process to subtract the black density from the density data of the three primary colors.

The density data are then subjected to smoothing by the MTF correction unit 61 using two-dimensional spatial filters, and sent to the magnification change unit 62, where the magnification is changed to a different one set by the user in advance. Finally, the density data are outputted to the printer control unit 130.

(3-2) Operations of the Digital Color Copying Machine

Figure 21:
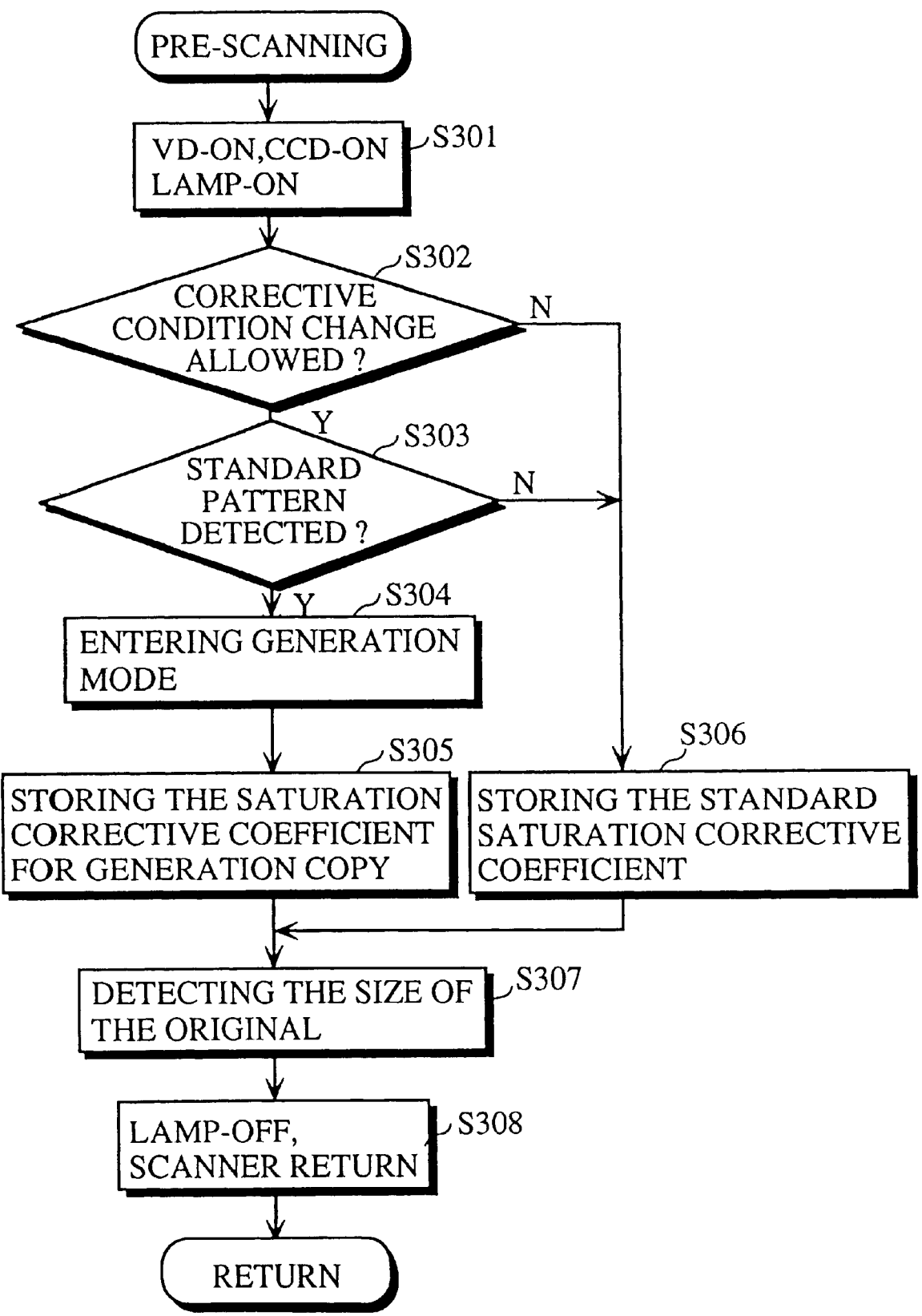
FIG. 21 is a flowchart showing a pre-scanning operation of the digital color copying machine of the present invention.

The operations of the digital color copying machine having the structure as described above are substantially the same as in the first embodiment shown in FIG. 9. However, the pre-scanning operation in this embodiment is markedly different from the pre-scanning in FIG. 10. So, the following explanation is for the pre-scanning operation, with reference to the flow chart in FIG. 21.

Firstly, the image reader control unit 110 instructs the scanner 11 to apply a voltage to the CCD sensor 14 (CCD-ON), a VD signal is generated to stimulate the output of the image data from the CCD sensor 14 (VD-ON), the exposure lamp 12 is switched on (LAMP-ON), and pre-scanning is then started (step S301).

The color image data obtained by scanning the original are subjected to shading correction, and written in the frame memory 55.

If the user has not sent the instruction to make "no corrective condition change" from the operation panel, it is judged that a change of the corrective condition is allowed (step S302), and the standard pattern detection unit 64 retrieves the image data written in the frame memory 55 (step S303). When the dot standard pattern has been detected, the standard pattern detection unit 56 informs the CPU 70 of the detection result.

Upon receipt of the information, the CPU 70 switches to the generation mode (step S304), and the saturation corrective coefficient Kgj for each color in a generation copy is read from the ROM 71 and stored in the RAM 72 (step S305).

In the case where a change of the saturation corrective condition has not been allowed in step S302, or where the standard pattern has not been detected in step S303, the CPU 70 reads out the standard saturation corrective coefficient Ksj for each color region from the ROM 71 and stores it in the RAM 72 (step S306).

The size of the original is detected according to the data in the frame memory 55 (step S310), the exposure lamp 12 is switched off (LAMP-OFF), the scanner is returned to the home position (SCANNER RETURN), and finally the pre-scanning is finished (steps S307 and S308). Step S4 of FIG. 9 is then performed to conduct the sensor input, the process control, and the main scanning.

The image data read by the main scanning are subjected to saturation correction by the saturation correction processing unit 654 using the saturation corrective coefficient for each color stored in the RAM 72.

In this embodiment, the dot standard pattern is formed within the image printing area, and after the standard pattern has been detected, the original is judged to be a hard copy. As the saturation correction is performed using predetermined saturation corrective coefficients for generation copy, the correction result is not as immaculate as in the first and second embodiment in which an actual decrease in saturation is determined by the standard pattern of each color. The saturation decrease ratio of the hard copy, however, can be determined quantitatively through advance experiments, and with a quantity of the data obtained through the experiments, it is not so difficult to set saturation corrective coefficients with minimum error.

The standard pattern may be designed to indicate the specific code (machine code) for the copying machine which produces a copy to be used as an original, so that the most suitable saturation corrective coefficients for generation copy can be selected.

The saturation corrective coefficients for each type of the copying machines which have produced an original copy are stored in the ROM 71 in advance. The standard pattern detection unit 64 reads a suitable machine code from the standard pattern and send it to the CPU 70. In response to that, the CPU 70 selects the saturation corrective coefficients corresponding to the machine code and stores them in the RAM 72 for each color region. According to those saturation corrective coefficients, saturation correction is performed on the image data read by the main scanning.

By doing so, immaculate saturation correction can be conducted to meet the characteristics of the copying machine which has produced the original copy.

Saturation corrective coefficients which vary depending on the generation of the original copy may also be determined beforehand, and by detecting a saturation decrease in the dot standard pattern, the generation of the copy is assumed to compensate the saturation decrease using the saturation corrective coefficients corresponding to the generation.

In this embodiment, the image data are converted into color region signals in an HVC color space, and the saturation correction is performed in that color space (as in the first embodiment), but the saturation correction can be performed by changing the UCR/BP corrective coefficients and the density coefficient (as in the second embodiment).

In such case, the UCR/BP corrective coefficients and the density corrective coefficient for each color region have been stored in the ROM 71 in advance. When entering the generation mode, those corrective coefficients are sent to the UCR/BP processing unit 59 and the masking unit 60, where the UCR/BP process and the density correction are performed, respectively.

(4) Fourth Embodiment

In the above embodiments, an original is automatically judged to be a hard copy from the standard pattern printed on the original, and the CPU enters the generation mode to change the saturation corrective conditions. So, the generation mode is not set in the case where the hard copy has been made by a copying machine which possesses no standard pattern printing function.

To avoid such problem, the generation mode can be set by hand in this embodiment.

Figure 22:
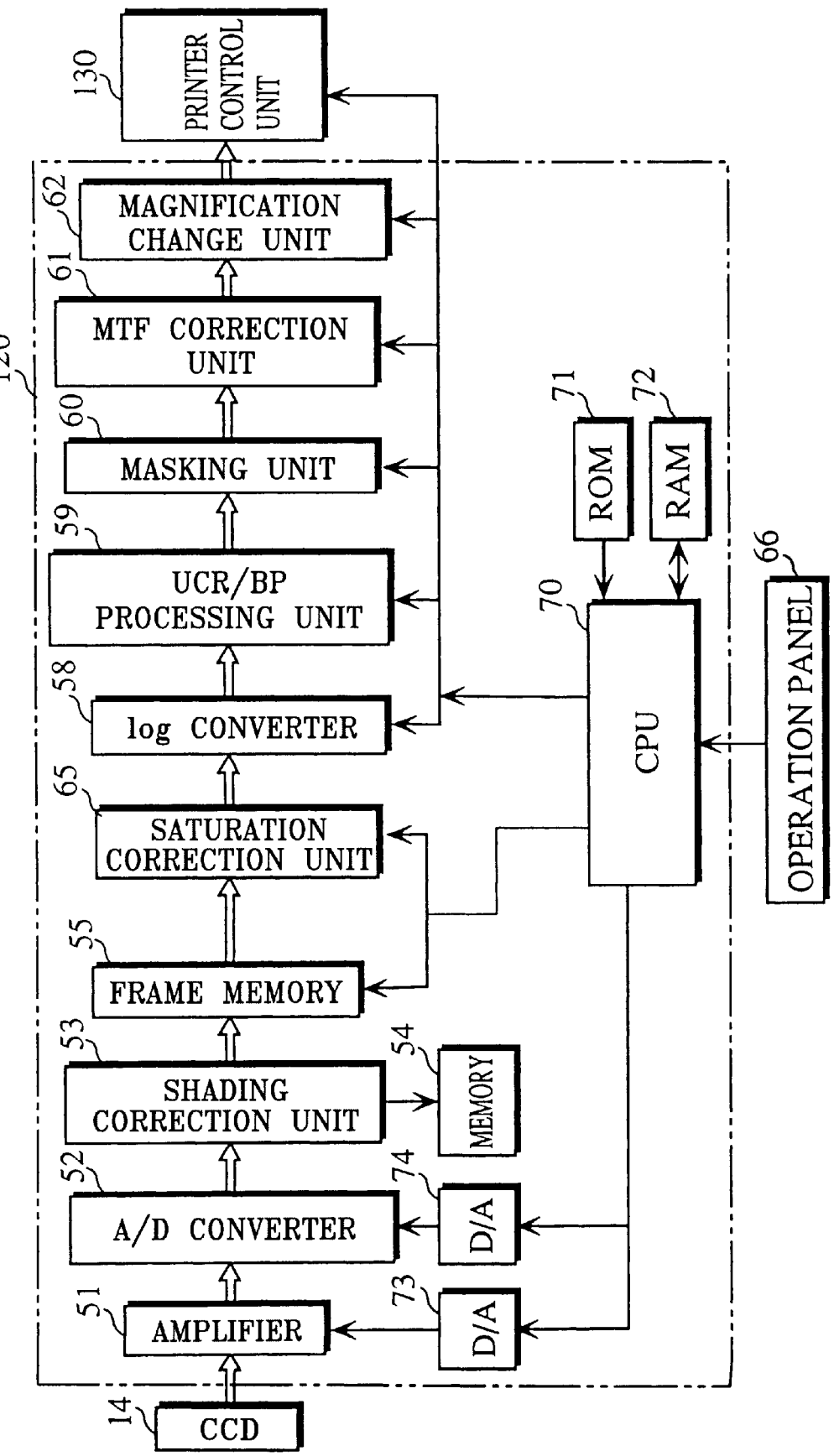
FIG. 22 is a block diagram of a image signal processing unit in a digital color copying machine in a fourth embodiment of the present invention.

The overall structure of the digital color copying machine is substantially the same as in the above embodiments. The image signal processing unit 123 of this embodiment, however, is markedly different, so the following explanation is for the image signal processing unit 123, with reference to FIG. 22.

(4-1) Structure of The Image Signal Processing Unit

The structure of the image signal processing unit 120 is substantially the same as the structure of the image signal processing unit 120 of the third embodiment shown in FIG. 19, except that the standard pattern detection unit 64 is not included. Instead, the user can send an instruction to set the generation mode from the operation panel 66.

Figure 23:
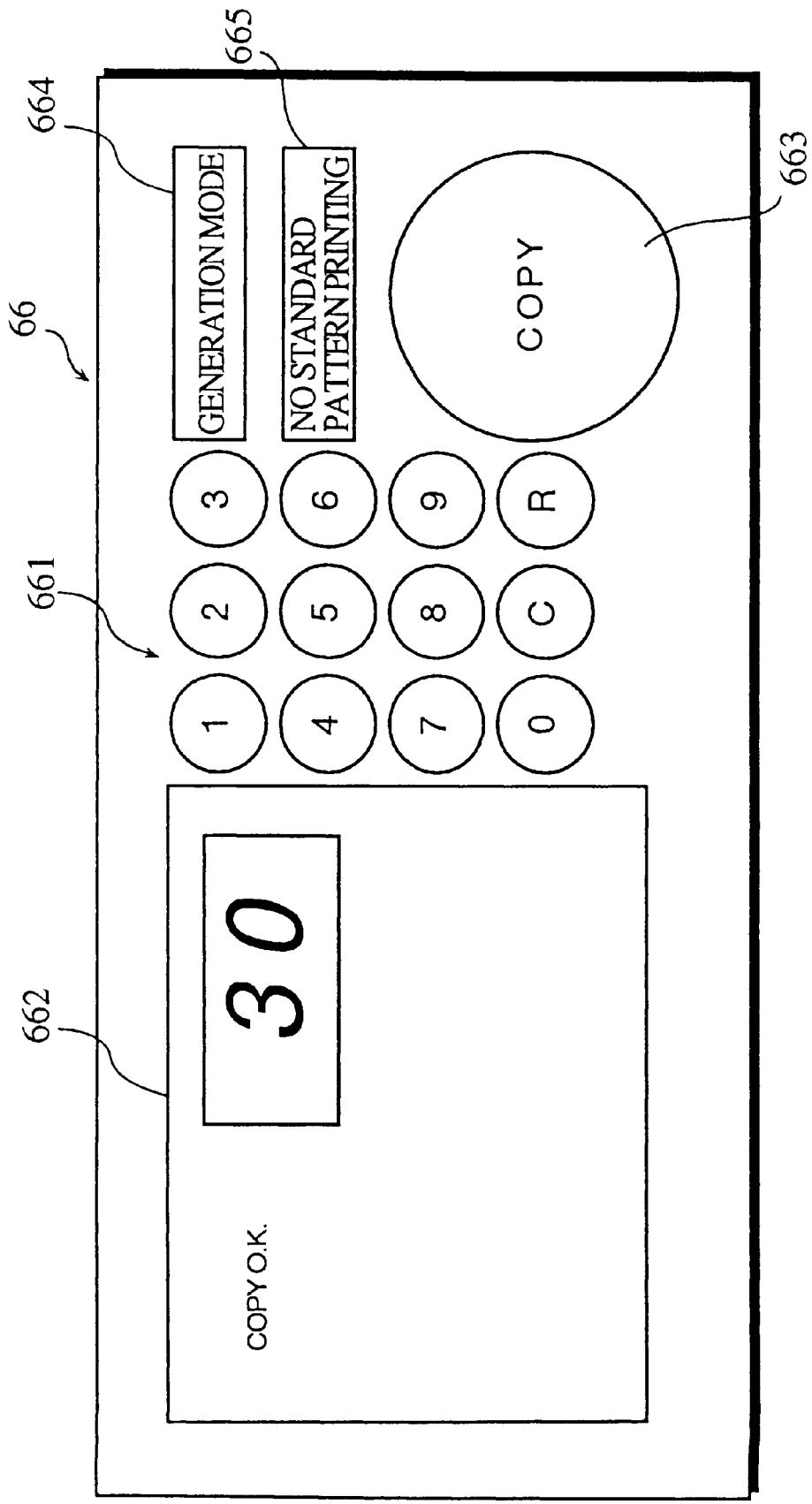
FIG. 23 shows an example structure of a operation panel of the digital color copying machine of the present invention.

FIG. 23 shows an example structure of the operation panel 66, which comprises a 10-keypad 661, a liquid crystal display 662 for displaying the number of copies to be made and a message to the user, and a copy key 663 for starting the copying operation. Besides these conventional operation keys, the operation panel 66 further comprises a generation mode key 664, and a pattern printing prohibiting key 665 for prohibiting the printing of the standard pattern.

When the original is a hard copy, the generation mode key 664 is pressed to set the generation mode, and the copy key 663 is pressed to start copying. In response to that, the CPU 70 determines that the original is a hard copy, and puts the saturation correction in the generation mode.

The structure and operations of the image processing unit is the same as in the third embodiment, except that the generation mode can be set by the hand of the user.

The standard saturation corrective coefficient Ksj for each of the color regions of C, M, Y, R, G, and B for an initial original, and the saturation corrective coefficient Kgj for generation copy are stored beforehand in the ROM 71. When the generation mode has been set, the saturation corrective coefficient Kgj for generation copy is read from the ROM 71, and stored in the RAM 72 for each color region.

On the other hand, when the generation mode key 664 has not been pressed, the standard saturation corrective coefficient Ksj for generation copy is read from the ROM 71, and stored in the RAM 72.

After the saturation corrective coefficients for each color region have been set, it is determined to which color region the image data belong, and the image data are subjected to saturation correction by the saturation correction unit 65 using the saturation corrective coefficients.

(4-2) Operations of the Digital Color Copying Machine

Figure 24:
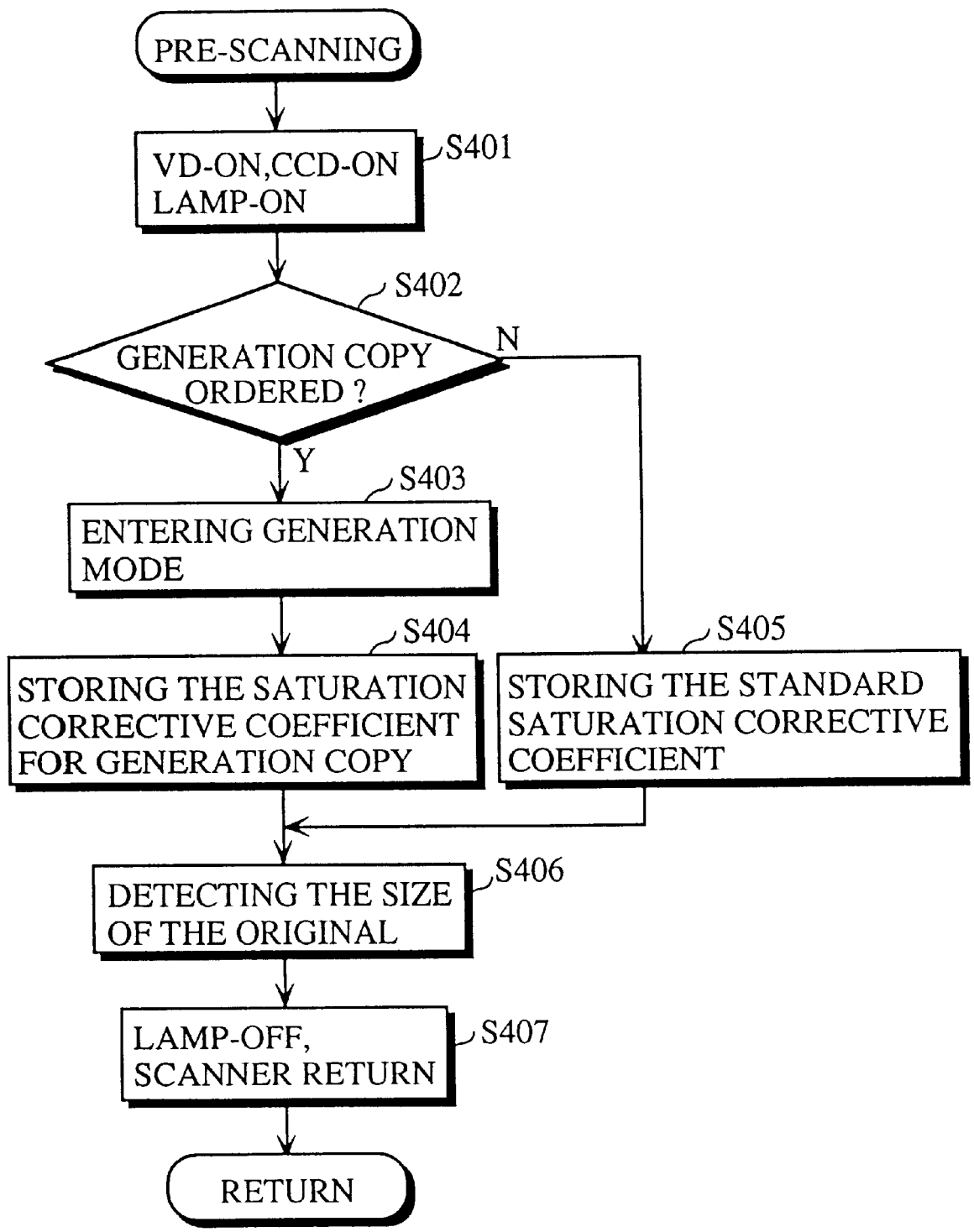
FIG. 24 is a flowchart showing a pre-scanning operation of the digital color copying machine of the present invention.

The operations of the digital color copying machine having the structure as described above are substantially the same as in the other embodiments. However, the pre-scanning operation in this embodiment is markedly different, so the following explanation is for the pre-scanning operation, with reference to the flow chart in FIG. 24.

Firstly, the image reader control unit 110 instructs the scanner 11 to apply a voltage to the CCD sensor 14 (CCD-ON), a VD signal is generated to stimulate the output of the image data from the CCD sensor 14 (VD-ON), the exposure lamp 12 is switched on (LAMP-ON), and pre-scanning is then started (step S401).

The color image data obtained by scanning the original are subjected to shading correction, and written in the frame memory 55.

In the case where the user has pressed the generation mode key 664 on the operation panel 66 to set the generation mode, the CPU 70 puts the saturation correction in the generation mode, and the saturation corrective coefficient Kgj for generation copy is read from the ROM 71, and stored in the RAM 72 for each color region (steps S402, S403, and S404).

In the case where the generation mode key 664 has not been pressed, on the other hand, the original is judged to be an initial original, and the standard saturation corrective coefficient Ksj is read from the ROM 71 and stored in the RAM 72 (step S405).

After that, the size of the original is detected according to the data in the frame memory 55 (step S406), the exposure lamp is switched off (LAMP-OFF), the scanner 11 is returned to the home position (SCANNER RETURN) (step S407), and the pre-scanning is finished. Step S4 of FIG. 9 is then performed, and after the sensor input and the process control, the image data read by the main scanning are subjected to saturation correction using the saturation corrective coefficient for each color region stored in the RAM 72.

As described so far, in this embodiment, the original is judged to be a hard copy in response to an instruction from the user, and the saturation correction is performed using a predetermined saturation corrective coefficient for generation copy. Because of that, the saturation correction of this embodiment cannot help being a bit inaccurate, compared with the saturation correction performed in the first and second embodiments, in which a saturation corrective condition is determined from a decrease in saturation measured by reading the standard pattern of each color. It is possible, however, to set a saturation corrective value which sufficiently compensates an actual saturation decrease determined by experiments. Also, this embodiment has the advantage that even if the original is a hard copy made by a copying machine without the standard pattern printing function, the generation mode can be set by the hand of the user.

It is also possible to input the information regarding the generation of the hard copy used as an original and the code (machine code) of the copying machine which has made the hard copy, and to determine saturation corrective coefficients for generation copy in accordance with the inputted information.

In that case, the ROM 71 stores the type of the copying machine which has copied the original or the saturation corrective coefficients for generation copy corresponding to the generation of the hard copy. In response to the input of the machine code or the generation number, the saturation corrective coefficients for generation copy are read from the ROM 71 and stored in the RAM 72 for each color region. By performing saturation correction using those saturation corrective coefficients, a generation copy with excellent reproducibility can be achieved.

In this embodiment, the image data are converted into signals in an HVC color space, and the saturation correction is performed in that color space (as in the first embodiment), but the saturation correction can be performed by changing the UCR/BP corrective coefficients and the density coefficient (as in the second embodiment).

In such case, the UCR/BP corrective coefficients and the density corrective coefficient for each color region have been stored in the ROM 71 in advance. When entering the generation mode, those UCR/BP corrective conditions are sent to the UCR/BP processing unit 59 and the masking unit 60, where the UCR/BP process and the masking process described in the second embodiment are executed using the saturation corrective coefficients.

(5) Modifications

Although the present invention have been described by way of the above embodiments, it should be noted that the present invention is not limited to those embodiments, and the following modifications can be made.

(5-1) In the first and second embodiments, the standard pattern includes the seven solid color patterns of C, M, Y, R, G, B, and K. The chromatic colors are divided into C, M, Y, R, G, and B, because all the hues can be included in these six color regions, as shown in FIG. 5. As long as the color regions include all the hues, the number of the chromatic colors in the standard pattern may be more or less than six.

It is also possible to prepare individual patterns which vary in lightness of each color, so that more specific color regions which can be discriminated by both hue and lightness are provided to prescribe more specific saturation corrective conditions. In such case, the color region discriminating criteria of the color region discriminator and the standard corrective coefficients stored in the ROM are changed for each of the color regions.

The individual patterns may be half-tone instead of solid colors.

(5-2) The saturation correction of the third and fourth embodiments is performed using the corrective coefficients set for each of the color regions to which the read image data belong, but it is also possible to set the same saturation corrective coefficients for all the color regions, with the corrective coefficients changing depending only on whether the original being copied is an initial image or a hard copy.

(5-3) By incorporating the fourth embodiment into the first, second, and third embodiments, the generation mode may be set by hand as well as by detecting the standard pattern.

(5-4) The saturation correction of the first, third, and fourth embodiments is performed on the color region signals in the HVC color space converted from the image data of R, G, and B, but the color space is not limited to the HVC color space, and it may be an L*a*b* color space or the like, as long as it is a uniform color space and saturation correction can be performed in it.

(5-5) Although the generation mode is set after the standard pattern has been detected in the first, second, and third embodiments, it is not necessary for the copying machine to have the standard pattern printing function only if the copying machine which has made the hard copy possesses the function. Naturally, it is preferable that both printing machines should have the same printing data in the ROM 71.

In the third embodiment, a mark may be put in the margin in the original by the user, and when the mark has been detected, the generation mode may be set. In such case, no standard pattern printing function is necessary.

(5-6) Although the saturation corrective conditions in the above embodiments are changed when the original is a hard copy, this method of changing the corrective conditions is applicable to the copying of originals of other types which need saturation correction.

A mark (standard pattern) for specifying the type the original may be put (or a specific original key may be provided), and by detecting the mark (or by pressing the specific original key), the saturation corrective conditions are determined to meet the characteristics of the specific original.

(5-7) The image processing in the above embodiments is performed in a digital color copying machine, but the image processing apparatus of the present invention can also be applied to other image forming apparatus, such as a color facsimile machine. In other words, this type of image processing apparatus is suitable for general image forming apparatus which generates digital image data by reading an original, and reproduces the color original on a copying paper or the like in accordance with the image data which have been processed.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included herein.

What is claimed is:

1. An image forming apparatus comprising:
    an input unit for receiving image data of each color obtained by reading an original;
    an original discriminator for reviewing said image data and for determining whether said original is of a particular type or not based on said image data;
    a condition deciding unit for determining saturation corrective conditions for said image data according to a result output from said original discriminator;
    a saturation correction unit for performing saturation correction for said image data according to said determined saturation corrective conditions; and
    an image forming unit, coupled to said saturation correction unit, for forming an image representative of said original according to corrected image data, wherein said saturation correction unit (i) comprises a color region signal converter for converting the image data of each color into color region signals in a uniform color space and (ii) performs saturation correction on said color region signals according to said saturation corrective conditions and then converts said color region signals back into image data of each color.

2. An image forming apparatus comprising:
    an input unit for receiving image data of each color obtained by reading an original;
    an original discriminator for reviewing said image data and for determining whether said original is of a particular type or not based on said image data;
    a condition deciding unit for determining saturation corrective conditions for said image data according to a result output from said original discriminator;
    a saturation correction unit for performing saturation correction for said image data according to said determined saturation corrective conditions; and
    an image forming unit, coupled to said saturation correction unit, for forming an image representative of said original according to corrected image data,
    wherein said saturation correction unit (i) comprises an undercolor removing unit for removing a density value of an overlapping portion in the density data of each color for each of the pixels which constitute said image data and a black generator for generating black density data using density data of each color and (ii) changes the undercolor removal ratio in an undercolor removing unit and a black generating ratio in said black generator.

3. An image forming apparatus comprising:
    an input unit for receiving image data of each color obtained by reading an original;
    an original discriminator for reviewing said image data and for determining whether said original is of a particular type or not based on said image data, wherein said original discriminator includes a standard pattern detector to detect a predetermined standard pattern within said image data and to further determine that said original is of a particular type when a predetermined standard pattern is detected;
    a condition deciding unit for determining saturation corrective conditions for said image data according to a result output from said original discriminator;
    a saturation correction unit for performing saturation correction for said image data according to said determined saturation corrective conditions; and
    an image forming unit, coupled to said saturation correction unit, for forming an image representative of said original according to corrected image data,
    wherein said condition deciding unit (i) comprises a saturation detection unit for detecting a decrease in saturation of said original according to the image data of said standard pattern and (ii) determines saturation corrective conditions to compensate said saturation decrease if the amount of said saturation decrease excesses a certain level.

4. An image forming apparatus comprising:
    an input unit for receiving image data of each color obtained by reading an original;
    an original discriminator for reviewing said image data and for determining whether said original is of a particular type or not based on said image data;
    a condition deciding unit for determining saturation corrective conditions for said image data according to a result output from said original discriminator;
    a saturation correction unit for performing saturation correction for said image data according to said determined saturation corrective conditions; and
    a memory for storing printing data of a predetermined standard pattern, wherein said predetermined standard pattern comprises blocks which represent at least one color region;
    an image forming unit, coupled to said saturation correction unit, for forming an image representative of said original according to corrected image data, wherein said image forming unit (i) is responsive to a user instruction to form an image according to said printing data of said predetermined standard pattern and said image data of said original and (ii) is adapted to form an image of said predetermined standard pattern in a margin formed around an original image forming area; and
    a color region discriminator for determining a color region said image data belong,
    wherein said condition deciding unit determines saturation corrective conditions for a color region by comparing a saturation of the image data of a block of said predetermined standard pattern with a predetermined saturation for a color region, and said saturation correction unit performs saturation correction in accordance with said determined saturation corrective conditions for a color region to which said image data belong.

5. An image processing apparatus which processes image data of each color obtained by reading an original, comprising:
    an original discriminator for automatically determining, based on said image data, whether said original is a copied original which has been made by copying another original;
    a saturation correction unit, coupled to said original discriminator, for at least performing saturation correction on said image data when said original has been judged to be a copied original;
    an image forming unit for forming an image representative of said image data which have been subjected to saturation correction; and
    a pattern data generator for generating printing data of a standard pattern,
    wherein said image forming unit forms an image according to said image data and said printing data of said standard pattern.

6. An image processing apparatus according to claim 5, wherein said original discriminator determines that said original is a copied original when image data of said standard pattern is detected in said image data of the original.

7. An image processing apparatus according to claim 6, wherein said saturation correction unit determines corrective conditions in accordance with said image data of said standard pattern.

8. A copying method comprising the steps of:
 (1) reading an original image and generating image data for each color of said original image;
 (2) incorporating printing data of a standard pattern into said image data generated in step (1), and forming an image in accordance with said image data;
 (3) reading said image formed in step (2) as an original and generating image data for each color of said original;
 (4) determining saturation corrective conditions in accordance with the image data of said standard pattern in said original image data read in step (3);
 (5) performing saturation correction on said original image data in accordance with said saturation corrective conditions determined in step (4); and
 (6) forming an image in accordance with said image data which are subjected to saturation correction in step (5).

* * * * *

UNITED STATES PATENT AND TRADEMARK OFFICE
CERTIFICATE OF CORRECTION

PATENT NO : 5,966,222
DATED : October 12, 1999
INVENTOR(S): Katsuyuki HIRATA et al.

It is certified that error appears in the above-identified patent and that said Letters Patent is hereby corrected as shown below:

Column 2, line 57, delete "FIG. 4 shows" and insert
--FIGS. 4A and 4B show--.

Column 6, line 1, delete "FIG. 4 is" and insert
--FIGS. 4A and 4B show--.

Column 26, line 5, delete "said" and insert --for a--.

Column 26, line 7, delete "excesses" and insert
--exceeds--.

Column 26, line 47, after "original," insert --said
apparatus--.

Column 26, line 55, delete "has been" and insert --is--.

Signed and Sealed this

Thirtieth Day of January, 2001

Attest:

Q. TODD DICKINSON

*Attesting Officer*     *Director of Patents and Trademarks*